(12) United States Patent
Lanka et al.

(10) Patent No.: US 12,704,895 B2
(45) Date of Patent: Aug. 11, 2026

(54) POWER GRID ALLOCATION IN EXTENDED REALITY (XR) DEVICES

(71) Applicant: QUALCOMM Incorporated, San Diego, CA (US)

(72) Inventors: Subbarao Lanka, Bangalore (IN); Chethan Devaraj, Bangalore (IN); Shruti Hanumanthaiah, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 42 days.

(21) Appl. No.: 18/545,813

(22) Filed: Dec. 19, 2023

(65) Prior Publication Data

US 2025/0199601 A1 Jun. 19, 2025

(51) Int. Cl.

| | |
|---|---|
| ***G06F 1/26*** | (2006.01) |
| ***G06F 1/32*** | (2019.01) |
| ***G06F 1/3293*** | (2019.01) |
| *H02M 3/04* | (2006.01) |

(52) U.S. Cl.

CPC ............. *G06F 1/3293* (2013.01); *H02M 3/04* (2013.01)

(58) Field of Classification Search

CPC .................................................... G06F 1/3293

See application file for complete search history.

(56) References Cited

U.S. PATENT DOCUMENTS

2007/0223165 A1* 9/2007 Itri .......................... H04M 3/18 361/115
2016/0109932 A1* 4/2016 Jeon ...................... G06F 1/3296 713/323
2017/0277238 A1 9/2017 Park et al.
2018/0101492 A1* 4/2018 Cho .......................... G06F 1/26
2020/0076371 A1* 3/2020 Zhang ....................... H04R 3/00
2021/0232470 A1* 7/2021 Xie ..................... G06F 11/2257
2022/0134838 A1* 5/2022 Ungarelli ................. B60H 3/00 165/202
2022/0391003 A1 12/2022 Rajagopal et al.
2024/0283860 A1* 8/2024 Li ......................... H04M 1/215
2024/0310888 A1* 9/2024 Keskin .................... G06F 1/263

OTHER PUBLICATIONS

International Search Report and Written Opinion—PCT/US2024/055544—ISA/EPO—Feb. 20, 2025.

* cited by examiner

*Primary Examiner* — Mohammed H Rehman
(74) *Attorney, Agent, or Firm* — Seyfarth Shaw LLP

(57) ABSTRACT

An apparatus includes multiple core devices, each core device configured to operate at multiple voltage levels. The apparatus also includes a power management integrated circuit (PMIC) comprising multiple power supplies, each power supply corresponding to one of the voltage levels. A first of the power supplies corresponds to a first voltage level selectively coupled to a first of the core devices configured to operate at the first voltage level. A second power supply of the power supplies corresponds to a second voltage level selectively coupled to the first of the core devices configured to operate at the second voltage level.

10 Claims, 30 Drawing Sheets

| | Logic Voltage (APC) | | |
|---|---|---|---|
| Functional | SS | TT | FFG |
| Turbo_L1 | 0.904 V | 0.856 V | 0.760 V |
| Turbo | 0.852 V | 0.800 V | 0.716 V |
| Nominal_L1 | 0.812 V | 0.768 V | 0.688 V |
| Nominal | 0.776 V | 0.728 V | 0.660 V |
| SVS_L2 | 0.768 V | 0.704 V | 0.640 V |
| SVS_L1 | 0.752 V | 0.684 V | 0.624 V |
| SVS | 0.740 V | 0.628 V | 0.568 V |
| LowSVS | 0.676 V | 0.572 V | 0.528 V |
| Retention | 0.352 V | 0.352 V | 0.352 V |

*FIG. 20*

| | Use Case#1 | Use Case#2 | Use Case#3 |
|---|---|---|---|
| | APC - NOM, 4 A<br>GPU- SVS_L1, 2 A<br>MM - SVS, 3 A<br>NSP - SVS, 3 A | APC - SVS, 3 A<br>GPU - NOM, 3 A<br>MM - NOM, 4 A<br>NSP - SVS, 3 A | APC - SVS, 3 A<br>GPU - SVS, 2 A<br>MM - SVS, 4 A<br>NSP - SVS, 3 A |
| S1 (4.5 A) | SVS | SVS | SVS |
| S2 (4.5 A) | SVS | SVS | SVS |
| S3 (4.5 A) | SVS_L1 | NOM | SVS |
| S4 (4.5 A) | NOM | NOM | OFF |
| Load Mapping | S1, S2 - MM, NSP<br>S3 - GPU<br>S4 - APC | S1 - APC<br>S2 - NSP<br>S3, S4 - GPU, MM | S1 - APC<br>S2, S3 - MM, GPU, NSP |

*FIG. 23*

POWER GRID ALLOCATION IN EXTENDED REALITY (XR) DEVICES

FIELD OF THE DISCLOSURE

The present disclosure relates generally to power control, and more specifically to a dynamic power grid for power optimized and area constrained wearable devices, such as augmented reality (AR) glasses.

BACKGROUND

Extended reality (XR) is a spectrum of immersive technologies that encompasses augmented reality (AR) and virtual reality (VR), combining real and virtual environments. AR merges the real world with virtual objects to support realistic, intelligent, and personalized experiences. Conventional AR applications provide a live view of a real-world environment whose elements may be augmented by computer-generated sensory input such as video, sound, graphics, or global positioning system (GPS) data. With such applications, a view of reality may be modified by a computing device, to enhance a user's perception of reality and provide more information about the user's environment. Virtual reality (VR) simulates physical presence in real or imagined worlds, and enables the user to interact in that world. Realizing XR requires the next level of artificial intelligence (AI) and connectivity within the thermal and power envelope of a wearable device, such as eyeglasses.

SUMMARY

In aspects of the present disclosure, an apparatus comprises multiple core devices, each core device configured to operate at multiple voltage levels. The apparatus also comprises a power management integrated circuit (PMIC) having multiple power supplies, each power supply corresponding to one of the voltage levels. A first of the power supplies corresponds to a first voltage level selectively coupled to a first of the core devices configured to operate at the first voltage level. A second of the power supplies corresponds to a second voltage level selectively coupled to the first of the core devices configured to operate at the second voltage level.

Other aspects of the present disclosure are directed to a method. The method includes receiving as input, a current specification for a first core device, a voltage specification for the first core device, a first output voltage of a first power supply, a second output voltage of a second power supply, and current ratings of the first power supply and the second power supply. The method also includes controlling a switch, which selectively couples the first core device to the first power supply and the second power supply, based on the input. The method further includes controlling the first output voltage and the second output voltage based on the input.

Still other aspects of the present disclosure are directed to a method. The method includes performing a task on a device having a shared power supply for multiple power rails. The method also includes determining whether current load information for the task is stored in a database. The method further includes detecting a task specific peak current level for each of the power rails, storing the task specific peak current level for each of the power rails in the database as current load information, and assigning the shared power supply to a default power rail, in response to determining the current load information for the task is not stored in the database. The method still further includes determining whether any of the power rails exceed a limit of the shared power supply for the task, in response to determining the current load information for the task is stored in the database. The method includes allocating, based on machine learning, the shared power supply to one of the power rails in response to at least one of the power rails exceeding the limit of the shared power supply.

This has outlined, rather broadly, the features and technical advantages of the present disclosure in order that the detailed description that follows may be better understood. Additional features and advantages of the present disclosure will be described below. It should be appreciated by those skilled in the art that the present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF DRAWINGS

The details of one or more examples of the disclosure are set forth in the accompanying drawings and the description below. Other features, objects, and advantages of the disclosure will be apparent from the description and drawings, and from the claims.

FIG. 20 is a table illustrating voltage level thresholds.

FIG. 23 is a table illustrating improved power grid use cases, according to various aspects of the present disclosure.

DETAILED DESCRIPTION

Figure 1:
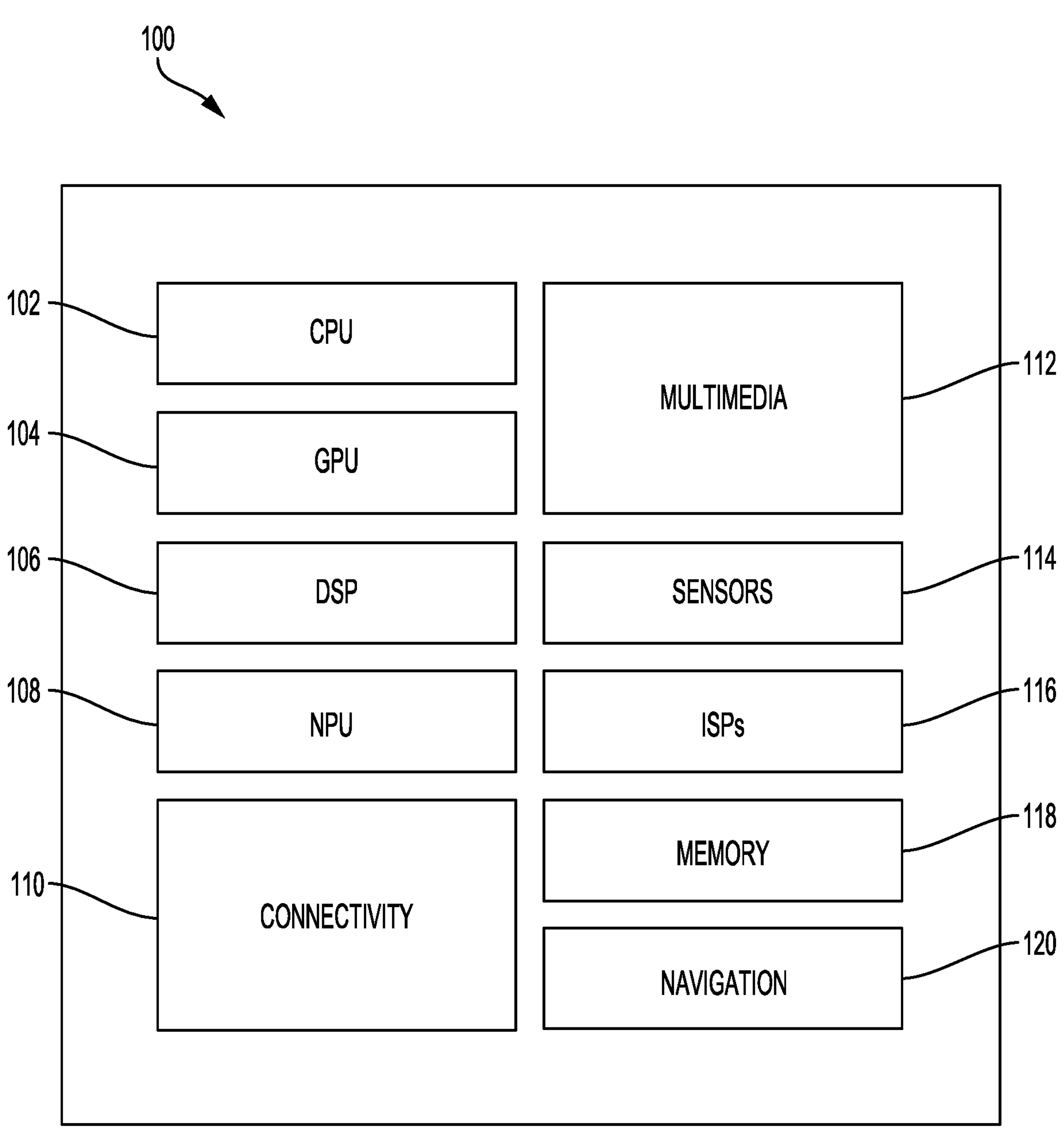
FIG. 1 illustrates an example implementation of a system-on-a-chip (SoC).

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings one skilled in the art should appreciate that the scope of this disclosure is intended to cover any aspect of the systems, apparatuses, computer program products, and methods disclosed, whether implemented independently of, or combined with, other aspects of the disclosure. For example, an apparatus may be implemented or a method may be practiced using any number of the aspects set forth. In addition, the scope of the disclosure is intended to cover such an apparatus or method which is practiced using other structure, functionality, or structure and functionality in addition to or other than the various aspects of the disclosure set forth. Any aspect disclosed may be embodied by one or more elements of a claim.

Although various aspects are described, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-a-chip (SoCs), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described, one or more techniques may refer to an application (e.g., software) being configured to perform one or more functions. In such examples, the application may be stored on a memory (e.g., on-chip memory of a processor, system memory, or any other memory). Hardware described, such as a processor may be configured to execute the application. For example, the application may be described as including code that, when executed by the hardware, causes the hardware to perform one or more techniques described. As an example, the hardware may access the code from a memory and executed the code accessed from the memory to perform one or more techniques described. In some examples, components are identified in this disclosure. In such examples, the components may be hardware, software, or a combination thereof. The components may be separate components or sub-components of a single component.

Accordingly, in one or more examples described, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, this disclosure describes techniques for integrating subsystems or modules that are located on physically separated printed circuit boards (PCBs). For example, augmented reality or virtual reality (AR/VR) devices may have modules located physically distant from one another. However, the present disclosure is equally applicable to any type of system with modules or PCBs spaced apart but electrically connected (e.g., with a flex cable, a flex PCB, a coaxial cable, a rigid PCB, etc.) In some aspects, the solutions integrate at least one slave subsystem with a master subsystem by implementing all control and status monitor functions between the subsystems. For example, certain bi-directional functions may be implemented between master and slave subsystems, such as power on triggers, reset triggers, shutdown triggers, fault propagation, and fail-safe reset triggers.

As used, the term “coder” may generically refer to an encoder and/or decoder. For example, reference to a “content coder” may include reference to a content encoder and/or a content decoder. Similarly, as used, the term “coding” may generically refer to encoding and/or decoding. As used, the terms “encode” and “compress” may be used interchangeably. Similarly, the terms “decode” and “decompress” may be used interchangeably.

As used, instances of the term “content” may refer to the term “video,” “graphical content,” “image,” and vice versa. This is true regardless of whether the terms are being used as an adjective, noun, or other part of speech. For example, reference to a “content coder” may include reference to a “video coder,” “graphical content coder,” or “image coder,” and reference to a “video coder,” “graphical content coder,” or “image coder” may include reference to a “content coder.” As another example, reference to a processing unit providing content to a content coder may include reference to the processing unit providing graphical content to a video encoder. In some examples, the term “graphical content” may refer to a content produced by one or more processes of a graphics processing pipeline. In some examples, the term “graphical content” may refer to a content produced by a processing unit configured to perform graphics processing. In some examples, the term “graphical content” may refer to a content produced by a graphics processing unit.

Instances of the term “content” may refer to graphical content or display content. In some examples, the term “graphical content” may refer to a content generated by a processing unit configured to perform graphics processing. For example, the term “graphical content” may refer to content generated by one or more processes of a graphics processing pipeline. In some examples, the term “graphical content” may refer to content generated by a graphics processing unit. In some examples, as used herein, the term “display content” may refer to content generated by a processing unit configured to perform displaying processing. In some examples, the term “display content” may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling (e.g., upscaling or downscaling) on a frame. In some examples, a frame may refer to a layer. In other examples, a frame may refer to two or more layers that have already been blended together to form the frame (e.g., the frame includes two or more layers, and the frame that includes two or more layers may subsequently be blended)

As referenced, a first component (e.g., a processing unit) may provide content, such as graphical content, to a second component (e.g., a content coder). In some examples, the first component may provide content to the second component by storing the content in a memory accessible to the second component. In such examples, the second component may be configured to read the content stored in the memory by the first component. In other examples, the first component may provide content to the second component without any intermediary components (e.g., without memory or another component). In such examples, the first component may be described as providing content directly to the second component. For example, the first component may output the content to the second component, and the second component may be configured to store the content received from the first component in a memory, such as a buffer.

For a mobile device, such as a mobile telephone, a single printed circuit board (PCB) may support multiple components including a CPU, GPU, DSP, etc. For an augmented reality (AR) or virtual reality (VR) device, the components may be located on different PCBs due to the form factor of the AR or VR device. For example, the AR or VR device may be in the form of eyeglasses. In an example implementation, a main SoC (also referred to as a main processor) and a main power management integrated circuit (PMIC) may reside on a first PCB in one of the arms of the eyeglasses.

A camera and sensor co-processor and associated PMIC may reside on a second PCB near the bridge of the eyeglasses. A connectivity processor and associated PMIC may reside on a third PCB on the other arm of the eyeglasses.

For wider market adoption, augmented reality (AR) glasses should be lightweight, and have a small form factor (e.g., sleek form factor). In fact, original equipment manufacturers (OEMs) may specify maximum dimension limits to achieve a sleek form factor. A small form factor, however, restricts chip count, chip package size, battery size, and battery capacity. The printed circuit board (PCB) inside the side arm of AR glasses drives the overall product size. The main system-on-a-chip (SoC) and power management integrated circuit (PMIC) package size dictate the overall PCB size on each arm of the AR glasses. To achieve dimension targets, only one PMIC with associated passive devices can be placed on the PCB due to a Y-dimension limit. Although AR glasses are primarily discussed, the present disclosure applies to any type of wearable device or hearable device, such as a smart watch, fitness tracker, or ear buds, for example.

For next generation augmented reality chips, the SoC feature set is increasing. The PCB size specifications, however, are very stringent. In fact, the SoC package size specification will decrease over time, forcing a PMIC size reduction. With the increased feature set, power consumption of each core device and associated power rail will correspondingly increase, which in turn requires additional power supplies or regulators. To provision more regulators, either multiple PMICs are added or a larger single PMIC is introduced. Both solutions increase the PCB's Y-dimension, which is detrimental to the goal of obtaining sleek glasses.

Instead of adding a PMIC, another solution is to throttle the core devices to limit peak current. This solution, however, negatively impacts the user experience. Lower power consumption would improve the user experience by allowing a lower battery capacity, resulting in a smaller size. An option to achieve lower power consumption for small batteries is to split each rail into multiple rails, which again increases the regulator requirement and PCB area. It would be desirable to be able to deliver the peak current specified to achieve full performance with low power consumption, without increasing a number of regulators and PCB area.

According to aspects of the present disclosure, during peak current loading on a specific rail or from a specific core device, instead of adding more power supplies, the current capacity from under-utilized power supplies is used. In some aspects, a multiplexor (MUX) is employed for power distribution. By using a power MUX, a load can draw current from different regulators based on which regulator can supply the full current specified by the load.

According to aspects of the present disclosure, machine learning facilitates MUX switching. Because there may be many regulators that are under-loaded at any point, the machine learning module decides which regulator is the best to deliver current at a given point in time. The machine learning module can accept multiple inputs and selects a regulator for delivering the specified peak current.

According to aspects of the present disclosure, full performance is achieved with a reduced number of power supply phases. In prior systems, when the peak current exceeded the power supply limit, either an additional power supply was provisioned, or performance was throttled to keep the peak current within the limit. Instead of throttling cores, the techniques of the present disclosure intelligently power the core to achieve full performance without additional regulators. With the proposed techniques, unused power from various power supplies will be utilized to power the cores to achieve full performance.

According to further aspects of the present disclosure, an improved power grid reduces the overall number of power supplies. The improved power grid comprises one or more power supplies and one or more core devices, each power supply selectively coupled to each core device. The power supplies each operate at a determined voltage level such that one or more power supplies may provide current to one or more core devices depending on the voltage and current requirements of the core device. The improved power grid therefore permits a reduced number of power supplies when compared to conventional power grids.

According to aspects of the present disclosure, a power model is employed as part of machine learning for controlling MUX switching. In a shared rail system, each core may specify a different voltage for operation. If one of the cores on a power rail specifies a higher voltage, all cores on the same rail will run at the higher voltage, thereby impacting the power consumption. Improved power efficiency can be achieved if a core moves from a higher voltage supply to a lower voltage supply. Depending on the voltage requirement of each core, the core supply can move to an under-loaded power supply or a power supply with lower voltage to reduce days of use (DoU) impact. Aspects of the present disclosure use a power MUX to dynamically switch cores to a lower voltage power supply to achieve lower power consumption.

Particular aspects of the subject matter described in this disclosure can be implemented to realize one or more of the following potential advantages. In some examples, the described techniques for dynamic power management may be used in sleek form factor AR and VR designs, or any wearable or hearable device design. Advantages of the proposed solution include eliminating additional power supply phases for powering cores with higher feature sets. Thus, the PCB area does not increase, even though the capacity has increased. Moreover, full performance of the cores is achieved without using limits management or adding additional phases, preventing a negative impact to the user experience. Additionally, power improvements enable smaller batteries.

FIG. 1 illustrates an example implementation of a system-on-a-chip (SoC) 100 on a single printed circuit board (PCB). The host SoC 100 includes processing blocks tailored to specific functions, such as a connectivity block 110. The connectivity block 110 may include fifth generation (5G) new radio (NR) connectivity, fourth generation long term evolution (4G LTE) connectivity, Wi-Fi connectivity, USB connectivity, Bluetooth® connectivity, Secure Digital (SD) connectivity, and the like.

In this configuration, the SoC 100 includes various processing units that support multi-threaded operation. For the configuration shown in FIG. 1, the SoC 100 includes a multi-core central processing unit (CPU) 102, a graphics processor unit (GPU) 104, a digital signal processor (DSP) 106, and a neural processor unit (NPU) 108. The SoC 100 may also include a sensor processor 114, image signal processors (ISPs) 116, a navigation module 120, which may include a global positioning system, and a memory 118. The multi-core CPU 102, the GPU 104, the DSP 106, the NPU 108, and the multi-media engine 112 support various functions such as video, audio, graphics, extended reality (XR) gaming, artificial networks, and the like. Each processor core of the multi-core CPU 102 may be a reduced instruction set computing (RISC) machine (e.g., a RISC-V (RISC five) machine, an advanced RISC machine (ARM), a microprocessor, or some other type of processor. The NPU 108 may be based on an ARM instruction set.

Figure 2:
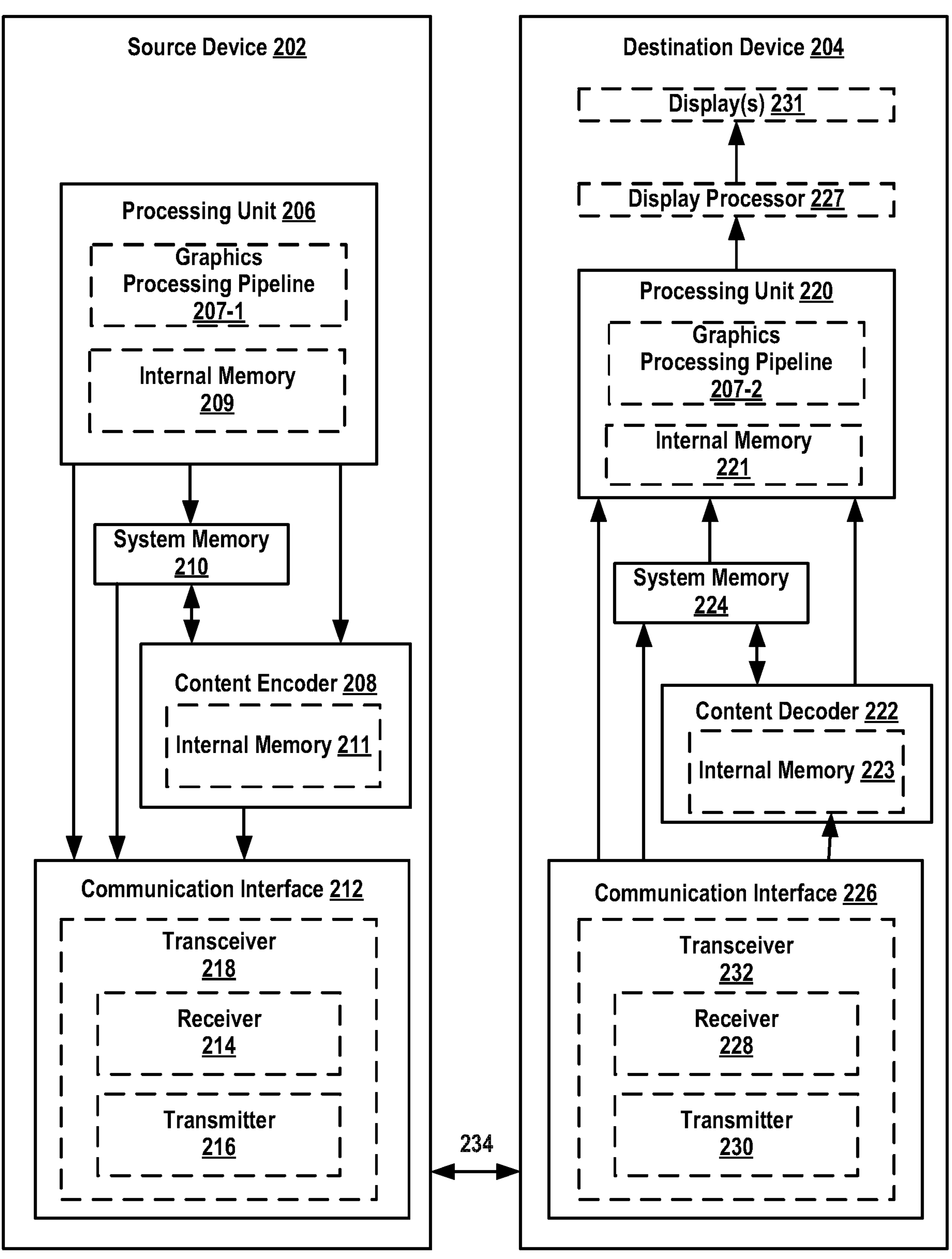
FIG. 2 is a block diagram that illustrates an example content generation and coding system to implement extended reality (XR) or virtual reality (VR) applications, in accordance with various aspects of the present disclosure.

FIG. 2 is a block diagram that illustrates an example extended reality (XR) or virtual reality (VR) system 200 configured to implement extended reality (XR) or VR applications, according to aspects of the present disclosure. The system 200 includes a source device 202 and a destination device 204. In accordance with the techniques described, the source device 202 may be configured to encode, using the content encoder 208, graphical content generated by the processing unit 206 prior to transmission to the destination device 204. The content encoder 208 may be configured to output a bitstream having a bit rate. The processing unit 206 may be configured to control and/or influence the bit rate of the content encoder 208 based on how the processing unit 206 generates graphical content.

The source device 202 may include one or more components (or circuits) for performing various functions described herein. The destination device 204 may include one or more components (or circuits) for performing various functions described. In some examples, one or more components of the source device 202 may be components of a system-on-a-chip (SoC). Similarly, in some examples, one or more components of the destination device 204 may be components of an SoC.

The source device 202 may include one or more components configured to perform one or more techniques of this disclosure. In the example shown, the source device 202 may include a processing unit 206, a content encoder 208, a system memory 210, and a communication interface 212. The processing unit 206 may include an internal memory 209. The processing unit 206 may be configured to perform graphics processing, such as in a graphics processing pipeline 207-1. The content encoder 208 may include an internal memory 211.

Memory external to the processing unit 206 and the content encoder 208, such as system memory 210, may be accessible to the processing unit 206 and the content encoder 208. For example, the processing unit 206 and the content encoder 208 may be configured to read from and/or write to external memory, such as the system memory 210. The processing unit 206 and the content encoder 208 may be communicatively coupled to the system memory 210 over a bus. In some examples, the processing unit 206 and the content encoder 208 may be communicatively coupled to each other over the bus or a different connection.

The content encoder 208 may be configured to receive graphical content from any source, such as the system memory 210 and/or the processing unit 206. The system memory 210 may be configured to store graphical content generated by the processing unit 206. For example, the processing unit 206 may be configured to store graphical content in the system memory 210. The content encoder 208 may be configured to receive graphical content (e.g., from the system memory 210 and/or the processing unit 206) in the form of pixel data. Otherwise described, the content encoder 208 may be configured to receive pixel data of graphical content produced by the processing unit 206. For example, the content encoder 208 may be configured to receive a value for each component (e.g., each color component) of one or more pixels of graphical content. As an example, a pixel in the red, green, blue (RGB) color space may include a first value for the red component, a second value for the green component, and a third value for the blue component.

The internal memory 209, the system memory 210, and/or the internal memory 211 may include one or more volatile or non-volatile memories or storage devices. In some examples, internal memory 209, the system memory 210, and/or the internal memory 211 may include random access memory (RAM), static RAM (SRAM), dynamic RAM (DRAM), erasable programmable ROM (EPROM), electrically erasable programmable ROM (EEPROM), Flash memory, a magnetic data media or an optical storage media, or any other type of memory.

The internal memory 209, the system memory 210, and/or the internal memory 211 may be a non-transitory storage medium according to some examples. The term "non-transitory" may indicate that the storage medium is not embodied in a carrier wave or a propagated signal. However, the term "non-transitory" should not be interpreted to mean that internal memory 209, the system memory 210, and/or the internal memory 211 is non-movable or that its contents are static. As one example, the system memory 210 may be removed from the source device 202 and moved to another device. As another example, the system memory 210 may not be removable from the source device 202.

The processing unit 206 may be a central processing unit (CPU), a graphics processing unit (GPU), a general purpose GPU (GPGPU), or any other processing unit that may be configured to perform graphics processing. In some examples, the processing unit 206 may be integrated into a motherboard of the source device 202. In some examples, the processing unit 206 may be present on a graphics card that is installed in a port in a motherboard of the source device 202, or may be otherwise incorporated within a peripheral device configured to interoperate with the source device 202.

The processing unit 206 may include one or more processors, such as one or more microprocessors, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 206 may store instructions for the software in a suitable, non-transitory computer-readable storage medium (e.g., internal memory 209), and may execute the instructions in hardware using one or more processors to perform the techniques of this disclosure. Any of the foregoing (including hardware, software, a combination of hardware and software, etc.) may be considered to be one or more processors.

The content encoder 208 may be any processing unit configured to perform content encoding. In some examples, the content encoder 208 may be integrated into a motherboard of the source device 202. The content encoder 208 may include one or more processors, such as one or more microprocessors, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the content encoder 208 may store instructions for the software in a suitable, non-transitory computer-readable storage medium (e.g., internal memory 211), and may execute the instructions in hardware using one or more processors to perform the techniques of this disclosure. Any of the foregoing (including hardware, software, a combination of hardware and software, etc.) may be considered to be one or more processors.

The communication interface 212 may include a receiver 214 and a transmitter 216. The receiver 214 may be configured to perform any receiving function described with respect to the source device 202. For example, the receiver 214 may be configured to receive information from the destination device 204, which may include a request for content. In some examples, in response to receiving the request for content, the source device 202 may be configured to perform one or more techniques described, such as produce or otherwise generate graphical content for delivery to the destination device 204. The transmitter 216 may be configured to perform any transmitting function described herein with respect to the source device 202. For example, the transmitter 216 may be configured to transmit encoded content to the destination device 204, such as encoded graphical content produced by the processing unit 206 and the content encoder 208 (e.g., the graphical content is produced by the processing unit 206, which the content encoder 208 receives as input to produce or otherwise generate the encoded graphical content). The receiver 214 and the transmitter 216 may be combined into a transceiver 218. In such examples, the transceiver 218 may be configured to perform any receiving function and/or transmitting function described with respect to the source device 202.

The destination device 204 may include one or more components configured to perform one or more techniques of this disclosure. In the example shown, the destination device 204 may include a processing unit 220, a content decoder 222, a system memory 224, a communication interface 226, and one or more displays 231. Reference to the displays 231 may refer to the one or more displays 231. For example, the displays 231 may include a single display or multiple displays. The displays 231 may include a first display and a second display. The first display may be a left-eye display and the second display may be a right-eye display. In some examples, the first and second display may receive different frames for presentment thereon. In other examples, the first and second display may receive the same frames for presentment thereon.

The processing unit 220 may include an internal memory 221. The processing unit 220 may be configured to perform graphics processing, such as in a graphics processing pipeline 207-2. The content decoder 222 may include an internal memory 223. In some examples, the destination device 204 may include a display processor, such as the display processor 227, to perform one or more display processing techniques on one or more frames generated by the processing unit 220 before presentment by the one or more displays 231. The display processor 227 may be configured to perform display processing. For example, the display processor 227 may be configured to perform one or more display processing techniques on one or more frames generated by the processing unit 220. The one or more displays 231 may be configured to display content that was generated using decoded content. For example, the display processor 227 may be configured to process one or more frames generated by the processing unit 220, where the one or more frames are generated by the processing unit 220 by using decoded content that was derived from encoded content received from the source device 202. In turn the display processor 227 may be configured to perform display processing on the one or more frames generated by the processing unit 220. The one or more displays 231 may be configured to display or otherwise present frames processed by the display processor 227. In some examples, the one or more display devices may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 220 and the content decoder 222, such as system memory 224, may be accessible to the processing unit 220 and the content decoder 222. For example, the processing unit 220 and the content decoder 222 may be configured to read from and/or write to external memory, such as the system memory 224. The processing unit 220 and the content decoder 222 may be communicatively coupled to the system memory 224 over a bus. In some examples, the processing unit 220 and the content decoder 222 may be communicatively coupled to each other over the bus or a different connection.

The content decoder 222 may be configured to receive graphical content from any source, such as the system memory 224 and/or the communication interface 226. The system memory 224 may be configured to store received encoded graphical content, such as encoded graphical content received from the source device 202. The content decoder 222 may be configured to receive encoded graphical content (e.g., from the system memory 224 and/or the communication interface 226) in the form of encoded pixel data. The content decoder 222 may be configured to decode encoded graphical content.

The internal memory 221, the system memory 224, and/or the internal memory 223 may include one or more volatile or non-volatile memories or storage devices. In some examples, internal memory 221, the system memory 224, and/or the internal memory 223 may include random access memory (RAM), static RAM (SRAM), dynamic RAM (DRAM), erasable programmable ROM (EPROM), electrically erasable programmable ROM (EEPROM), Flash memory, a magnetic data media or an optical storage media, or any other type of memory.

The internal memory 221, the system memory 224, and/or the internal memory 223 may be a non-transitory storage medium according to some examples. The term "non-transitory" may indicate that the storage medium is not embodied in a carrier wave or a propagated signal. However, the term "non-transitory" should not be interpreted to mean that internal memory 221, the system memory 224, and/or the internal memory 223 is non-movable or that its contents are static. As one example, the system memory 224 may be removed from the destination device 204 and moved to another device. As another example, the system memory 224 may not be removable from the destination device 204.

The processing unit 220 may be a central processing unit (CPU), a graphics processing unit (GPU), a general purpose GPU (GPGPU), or any other processing unit that may be configured to perform graphics processing. In some examples, the processing unit 220 may be integrated into a motherboard of the destination device 204. In some examples, the processing unit 220 may be present on a graphics card that is installed in a port in a motherboard of the destination device 204, or may be otherwise incorporated within a peripheral device configured to interoperate with the destination device 204.

The processing unit 220 may include one or more processors, such as one or more microprocessors, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 220 may store instructions for the software in a suitable, non-transitory computer-readable storage medium (e.g., internal memory 221), and may execute the instructions in hardware using one or more processors to perform the techniques of this disclosure. Any of the foregoing (including hardware, software, a combination of hardware and software, etc.) may be considered to be one or more processors.

The content decoder 222 may be any processing unit configured to perform content decoding. In some examples, the content decoder 222 may be integrated into a motherboard of the destination device 204. The content decoder 222 may include one or more processors, such as one or more microprocessors, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the content decoder 222 may store instructions for the software in a suitable, non-transitory computer-readable storage medium (e.g., internal memory 223), and may execute the instructions in hardware using one or more processors to perform the techniques of this disclosure. Any of the foregoing (including hardware, software, a combination of hardware and software, etc.) may be considered to be one or more processors.

The communication interface 226 may include a receiver 228 and a transmitter 230. The receiver 228 may be configured to perform any receiving function described herein with respect to the destination device 204. For example, the receiver 228 may be configured to receive information from the source device 202, which may include encoded content, such as encoded graphical content produced or otherwise generated by the processing unit 206 and the content encoder 208 of the source device 202 (e.g., the graphical content is produced by the processing unit 206, which the content encoder 208 receives as input to produce or otherwise generate the encoded graphical content). As another example, the receiver 228 may be configured to receive position information from the source device 202, which may be encoded or unencoded (e.g., not encoded). In some examples, the destination device 204 may be configured to decode encoded graphical content received from the source device 202 in accordance with the techniques described herein. For example, the content decoder 222 may be configured to decode encoded graphical content to produce or otherwise generate decoded graphical content. The processing unit 220 may be configured to use the decoded graphical content to produce or otherwise generate one or more frames for presentment on the one or more displays 231. The transmitter 230 may be configured to perform any transmitting function described herein with respect to the destination device 204. For example, the transmitter 230 may be configured to transmit information to the source device 202, which may include a request for content. The receiver 228 and the transmitter 230 may be combined into a transceiver 232. In such examples, the transceiver 232 may be configured to perform any receiving function and/or transmitting function described herein with respect to the destination device 204.

The content encoder 208 and the content decoder 222 of the system 200 represent examples of computing components (e.g., processing units) that may be configured to perform one or more techniques for encoding content and decoding content in accordance with various examples described in this disclosure, respectively. In some examples, the content encoder 208 and the content decoder 222 may be configured to operate in accordance with a content coding standard, such as a video coding standard, a display stream compression standard, or an image compression standard.

As shown in FIG. 2, the source device 202 may be configured to generate encoded content. Accordingly, the source device 202 may be referred to as a content encoding device or a content encoding apparatus. The destination device 204 may be configured to decode the encoded content generated by source device 202. Accordingly, the destination device 204 may be referred to as a content decoding device or a content decoding apparatus. In some examples, the source device 202 and the destination device 204 may be separate devices, as shown. In other examples, source device 202 and destination device 204 may be on or part of the same computing device. In either example, a graphics processing pipeline may be distributed between the two devices. For example, a single graphics processing pipeline may include a plurality of graphics processes. The graphics processing pipeline 207-1 may include one or more graphics processes of the plurality of graphics processes. Similarly, graphics processing pipeline 207-2 may include one or more processes graphics processes of the plurality of graphics processes. In this regard, the graphics processing pipeline 207-1 concatenated or otherwise followed by the graphics processing pipeline 207-2 may result in a full graphics processing pipeline. Otherwise described, the graphics processing pipeline 207-1 may be a partial graphics processing pipeline and the graphics processing pipeline 207-2 may be a partial graphics processing pipeline that, when combined, result in a distributed graphics processing pipeline.

In some examples, a graphics process performed in the graphics processing pipeline 207-1 may not be performed or otherwise repeated in the graphics processing pipeline 207-2. For example, the graphics processing pipeline 207-1 may include receiving first position information corresponding to a first orientation of a device. The graphics processing pipeline 207-1 may also include generating first graphical content based on the first position information. Additionally, the graphics processing pipeline 207-1 may include generating motion information for warping the first graphical content. The graphics processing pipeline 207-1 may further include encoding the first graphical content. Also, the graphics processing pipeline 207-1 may include providing the motion information and the encoded first graphical content. The graphics processing pipeline 207-2 may include providing first position information corresponding to a first orientation of a device. The graphics processing pipeline 207-2 may also include receiving encoded first graphical content generated based on the first position information. Further, the graphics processing pipeline 207-2 may include receiving motion information. The graphics processing pipeline 207-2 may also include decoding the encoded first graphical content to generate decoded first graphical content. Also, the graphics processing pipeline 207-2 may include warping the decoded first graphical content based on the motion information. By distributing the graphics processing pipeline between the source device 202 and the destination device 204, the destination device may be able to, in some examples, present graphical content that it otherwise would not be able to render; and, therefore, could not present. Other example benefits are described throughout this disclosure.

As described, a device, such as the source device 202 and/or the destination device 204, may refer to any device, apparatus, or system configured to perform one or more techniques described. For example, a device may be a server, a base station, user equipment, a client device, a station, an access point, a computer (e.g., a personal computer, a desktop computer, a laptop computer, a tablet computer, a computer workstation, or a mainframe computer), an end product, an apparatus, a phone, a smart phone, a server, a video game platform or console, a handheld device (e.g., a portable video game device or a personal digital assistant (PDA)), a wearable computing device (e.g., a smart watch, an augmented reality device, or a virtual reality device), a non-wearable device, an augmented reality device, a virtual reality device, a display (e.g., display device), a television, a television set-top box, an intermediate network device, a digital media player, a video streaming device, a content streaming device, an in-car computer, any mobile device, any device configured to generate graphical content, or any device configured to perform one or more techniques described herein.

Source device 202 may be configured to communicate with the destination device 204. For example, destination device 204 may be configured to receive encoded content from the source device 202. In some example, the communication coupling between the source device 202 and the destination device 204 is shown as link 234. Link 234 may comprise any type of medium or device capable of moving the encoded content from source device 202 to the destination device 204.

In the example of FIG. 2, link 234 may comprise a communication medium to enable the source device 202 to transmit encoded content to destination device 204 in real-time. The encoded content may be modulated according to a communication standard, such as a wireless communication protocol, and transmitted to destination device 204. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 202 to the destination device 204. In other examples, link 234 may be a point-to-point connection between source device 202 and destination device 204, such as a wired or wireless display link connection (e.g., a high-definition multimedia interface (HDMI) link, a DisplayPort link, mobile industry processor interface (MIPI) display serial interface (DSI) link, or another link over which encoded content may traverse from the source device 202 to the destination device 204.

In another example, the link 234 may include a storage medium configured to store encoded content generated by the source device 202. In this example, the destination device 204 may be configured to access the storage medium. The storage medium may include a variety of locally-accessed data storage media such as Blu-ray discs, DVDs, CD-ROMs, flash memory, or other suitable digital storage media for storing encoded content.

In another example, the link 234 may include a server or another intermediate storage device configured to store encoded content generated by the source device 202. In this example, the destination device 204 may be configured to access encoded content stored at the server or other intermediate storage device. The server may be a type of server capable of storing encoded content and transmitting the encoded content to the destination device 204.

Devices described may be configured to communicate with each other, such as the source device 202 and the destination device 204. Communication may include the transmission and/or reception of information. The information may be carried in one or more messages. As an example, a first device in communication with a second device may be described as being communicatively coupled to or otherwise with the second device. For example, a client device and a server may be communicatively coupled. As another example, a server may be communicatively coupled to multiple client devices. As another example, any device described configured to perform one or more techniques of this disclosure may be communicatively coupled to one or more other devices configured to perform one or more techniques of this disclosure. In some examples, when communicatively coupled, two devices may be actively transmitting or receiving information, or may be configured to transmit or receive information. If not communicatively coupled, any two devices may be configured to communicatively couple with each other, such as in accordance with one or more communication protocols compliant with one or more communication standards. Reference to "any two devices" does not mean that only two devices may be configured to communicatively couple with each other; rather, any two devices are inclusive of more than two devices. For example, a first device may communicatively couple with a second device and the first device may communicatively couple with a third device. In such an example, the first device may be a server.

With reference to FIG. 2, the source device 202 may be described as being communicatively coupled to the destination device 204. In some examples, the term "communicatively coupled" may refer to a communication connection, which may be direct or indirect. The link 234 may, in some examples, represent a communication coupling between the source device 202 and the destination device 204. A communication connection may be wired and/or wireless. A wired connection may refer to a conductive path, a trace, or a physical medium (excluding wireless physical mediums) over which information may travel. A conductive path may refer to any conductor of any length, such as a conductive pad, a conductive via, a conductive plane, a conductive trace, or any conductive medium. A direct communication connection may refer to a connection in which no intermediary component resides between the two communicatively coupled components. An indirect communication connection may refer to a connection in which at least one intermediary component resides between the two communicatively coupled components. Two devices that are communicatively coupled may communicate with each other over one or more different types of networks (e.g., a wireless network and/or a wired network) in accordance with one or more communication protocols. In some examples, two devices that are communicatively coupled may associate with one another through an association process. In other examples, two devices that are communicatively coupled may communicate with each other without engaging in an association process. For example, a device, such as the source device 202, may be configured to unicast, broadcast, multicast, or otherwise transmit information (e.g., encoded content) to one or more other devices (e.g., one or more destination devices, which includes the destination device 204). The destination device 204 in this example may be described as being communicatively coupled with each of the one or more other devices. In some examples, a communication connection may enable the transmission and/or receipt of information. For example, a first device communicatively coupled to a second device may be configured to transmit information to the second device and/or receive information from the second device in accordance with the techniques of this disclosure. Similarly, the second device in this example may be configured to transmit information to the first device and/or receive information from the first device in accordance with the techniques of this disclosure. In some examples, the term "communicatively coupled" may refer to a temporary, intermittent, or permanent communication connection.

Any device described, such as the source device 202 and the destination device 204, may be configured to operate in accordance with one or more communication protocols. For example, the source device 202 may be configured to communicate with (e.g., receive information from and/or transmit information to) the destination device 204 using one or more communication protocols. In such an example, the source device 202 may be described as communicating with the destination device 204 over a connection. The connection may be compliant or otherwise be in accordance with a communication protocol. Similarly, the destination device 204 may be configured to communicate with (e.g., receive information from and/or transmit information to) the source device 202 using one or more communication protocols. In such an example, the destination device 204 may be described as communicating with the source device 202 over a connection. The connection may be compliant or otherwise be in accordance with a communication protocol.

The term "communication protocol" may refer to any communication protocol, such as a communication protocol compliant with a communication standard or the like. As used herein, the term "communication standard" may include any communication standard, such as a wireless communication standard and/or a wired communication standard. A wireless communication standard may correspond to a wireless network. As an example, a communication standard may include any wireless communication standard corresponding to a wireless personal area network (WPAN) standard, such as Bluetooth (e.g., IEEE 802.15), Bluetooth low energy (BLE) (e.g., IEEE 802.15.4). As another example, a communication standard may include any wireless communication standard corresponding to a wireless local area network (WLAN) standard, such as WI-FI (e.g., any 802.11 standard, such as 802.11a, 802.11b, 802.11c, 802.11n, or 802.11ax). As another example, a communication standard may include any wireless communication standard corresponding to a wireless wide area network (WWAN) standard, such as 3G, 4G, 4G LTE, 5G, or 6G.

With reference to FIG. 2, the content encoder 208 may be configured to encode graphical content. In some examples, the content encoder 208 may be configured to encode graphical content as one or more video frames of extended reality (XR) or virtual reality (VR) content. When the content encoder 208 encodes content, the content encoder 208 may generate a bitstream. The bitstream may have a bit rate, such as bits/time unit, where time unit is any time unit, such as second or minute. The bitstream may include a sequence of bits that form a coded representation of the graphical content and associated data. To generate the bitstream, the content encoder 208 may be configured to perform encoding operations on pixel data, such as pixel data corresponding to a shaded texture atlas. For example, when the content encoder 208 performs encoding operations on image data (e.g., one or more blocks of a shaded texture atlas) provided as input to the content encoder 208, the content encoder 208 may generate a series of coded images and associated data. The associated data may include a set of coding parameters such as a quantization parameter (QP).

Figure 3:
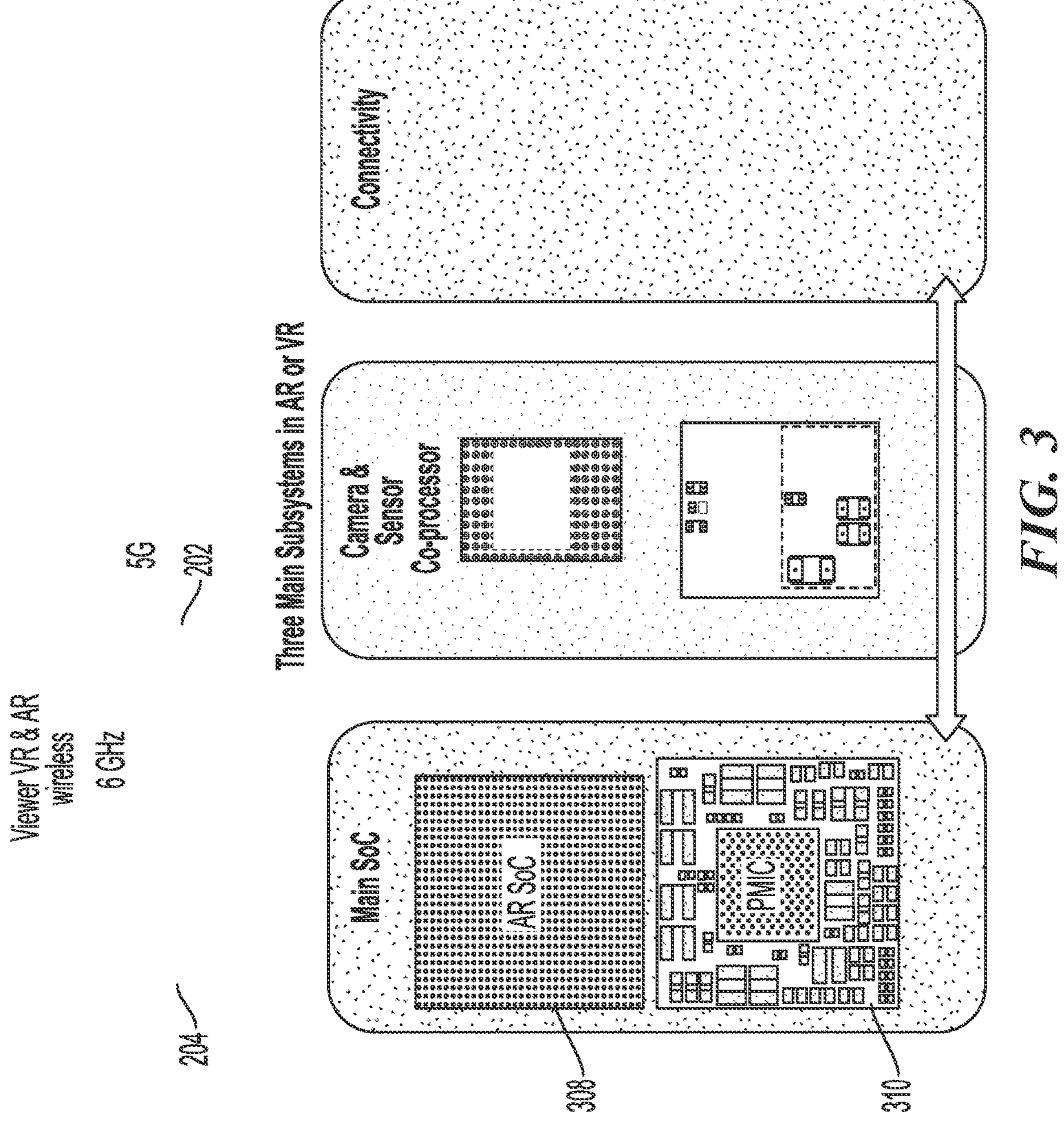
FIG. 3 is a block diagram illustrating augmented reality or virtual reality subsystems, according to various aspects of the present disclosure.

As shown in FIG. 1, a single printed circuit board (PCB) may support multiple components of the SoC 100, including the CPU 102, GPU 104, DSP 106, etc. For an AR or VR device, the components may be located on different PCBs. FIG. 3 is a block diagram illustrating augmented reality or virtual reality subsystems, according to aspects of the present disclosure. As seen in the example of FIG. 3, the destination device 204 may be in the form of eyeglasses and the source device 202 may be in the form of a mobile device. If the destination device 204 has an eyeglasses form factor, the various components may be distributed across multiple PCBs 302, 304, 306 in a multi-PCB architecture. For example, a master or main SoC 308 and a master power management integrated circuit (PMIC) 310 may reside on a first PCB 302, a camera and sensor co-processor 312 and associated PMIC 314 may reside on a second PCB 304, and a connectivity processor 316 and associated PMIC 318 may reside on a third PCB 306. Due to the separate locations of the PCBs 302, 304, 306, the length of connectors between the PCBs 302, 304, 306 may exceed design specifications. Moreover, the connectors may be arranged in a multi-drop configuration, which also impedes performance due to stubs and reflections. Flexible PCBs may also be used between PCBs 302, 304, 306, which may further impact signal integrity.

Figure 4:
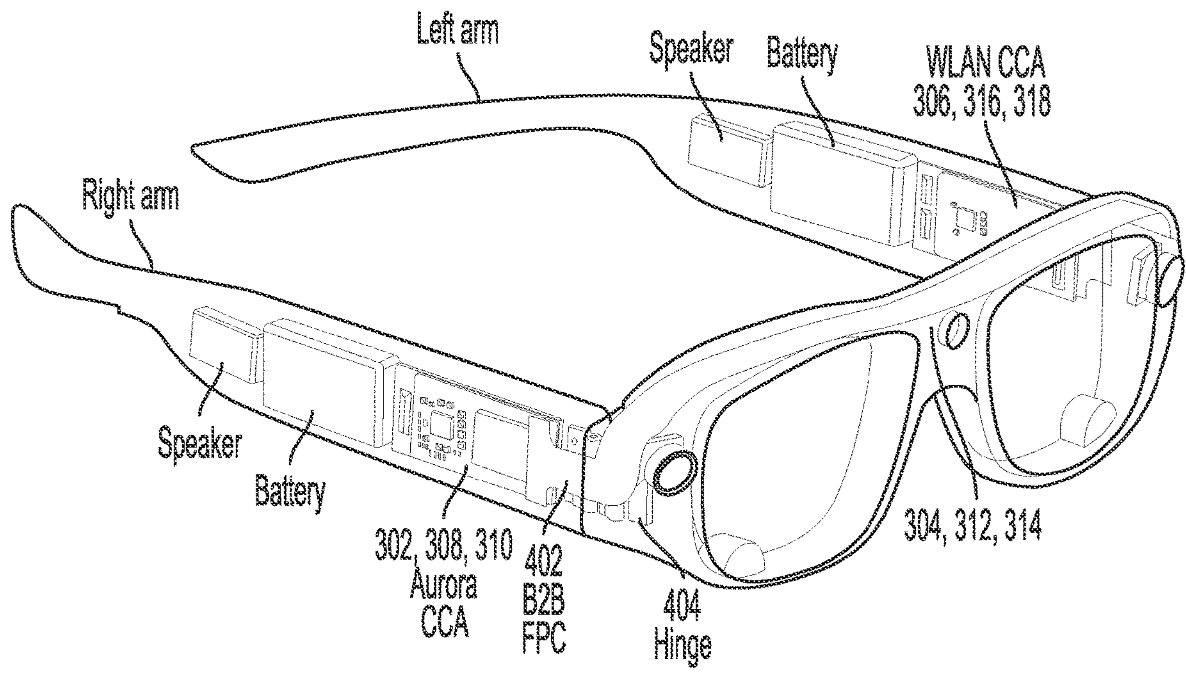
FIG. 4 is a diagram illustrating locations of components in a wearable device with an eyeglasses form factor, in accordance with various aspects of the present disclosure.

FIG. 4 is a diagram illustrating placement of components in a device with an eyeglasses form factor, in accordance with aspects of the present disclosure. As seen in the example of FIG. 4, the master SoC 308 and master power management IC (PMIC) 310 may reside on the first PCB 302 (also referred to as CCA—circuit card assembly) in one arm of the glasses, the camera and sensor co-processor 312 and associated PMIC 314 may reside on the second PCB 304 on the bridge of the eyeglasses, and the connectivity processor 316 and associated PMIC 318 may reside on the third PCB 306 on another arm of the glasses. Location of batteries and speakers are also shown in FIG. 4. A board-to-board (B2B) flexible printed circuit (FPC) connector 402 couples the first PCB 302, the second PCB 304, and the third PCB 306 across hinges 404 (only one labelled) of the eyeglasses. The augmented reality chip may be referred to as 'Aurora' throughout this disclosure.

Due to the small form factor of the device, small PCBs are provided, and thus there is small PCB area availability. Due to signals traveling across hinges, signal integrity may be affected. Moreover, the lengthy channels (e.g., up to 20 cm-25 cm from one arm to another arm of the eyeglasses) and channels on flex cables with high insertion loss may cause signal integrity issues for high-speed signals, such as system power management interface (SPMI) protocol signals. The small form factor of the eyeglasses specifies small board-to-board connectors. The small size places severe constraints on wires crossing hinges. For example, the number of signals able to be sent across hinges may be limited. Furthermore, the small volume of the eyeglasses frame constrains the trace thickness, limiting sharing of power rails across subsystems.

Figure 5A:
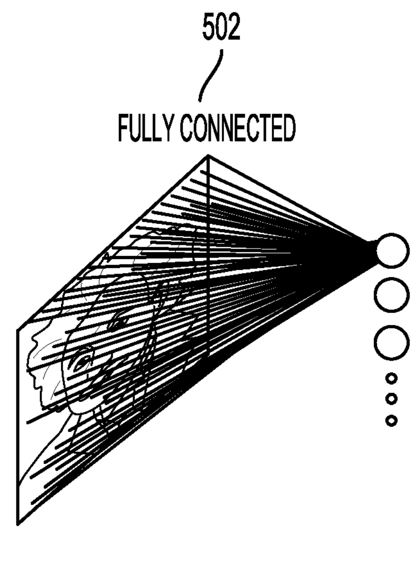
FIGS. 5A, 5B, and 5C are diagrams illustrating a neural network, in accordance with various aspects of the present disclosure.
Figure 5B:
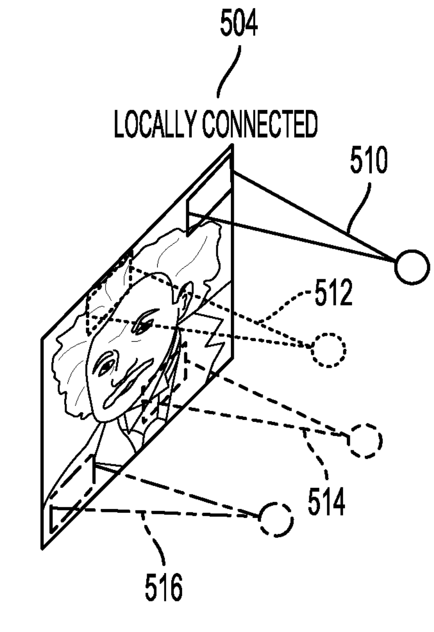

According to aspects of the present disclosure, machine learning techniques may be employed for a dynamic power grid. In some implementations, a neural network may be employed. The connections between layers of a neural network may be fully connected or locally connected. FIG. 5A illustrates an example of a fully connected neural network 502. In a fully connected neural network 502, a neuron in a first layer may communicate its output to every neuron in a second layer, so that each neuron in the second layer will receive input from every neuron in the first layer. FIG. 5B illustrates an example of a locally connected neural network 504. In a locally connected neural network 504, a neuron in a first layer may be connected to a limited number of neurons in the second layer. More generally, a locally connected layer of the locally connected neural network 504 may be configured so that each neuron in a layer will have the same or a similar connectivity pattern, but with connections strengths that may have different values (e.g., 510, 512, 514, and 516). The locally connected connectivity pattern may give rise to spatially distinct receptive fields in a higher layer because the higher layer neurons in a given region may receive inputs that are tuned through training to the properties of a restricted portion of the total input to the network.

Figure 5C:
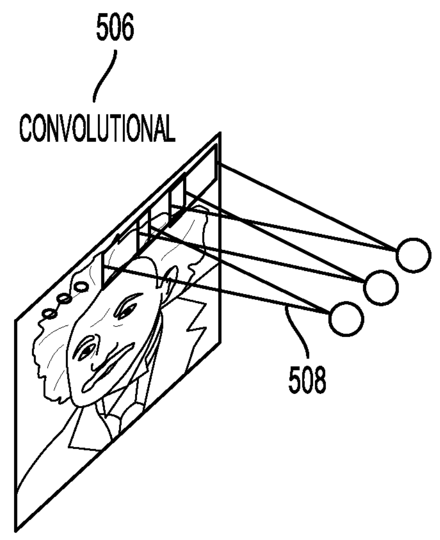

One example of a locally connected neural network is a convolutional neural network. FIG. 5C illustrates an example of a convolutional neural network 506. The convolutional neural network 506 may be configured such that the connection strengths associated with the inputs for each neuron in the second layer are shared (e.g., 508). Convolutional neural networks may be well suited to problems in which the spatial location of inputs is meaningful.

Figure 5D:
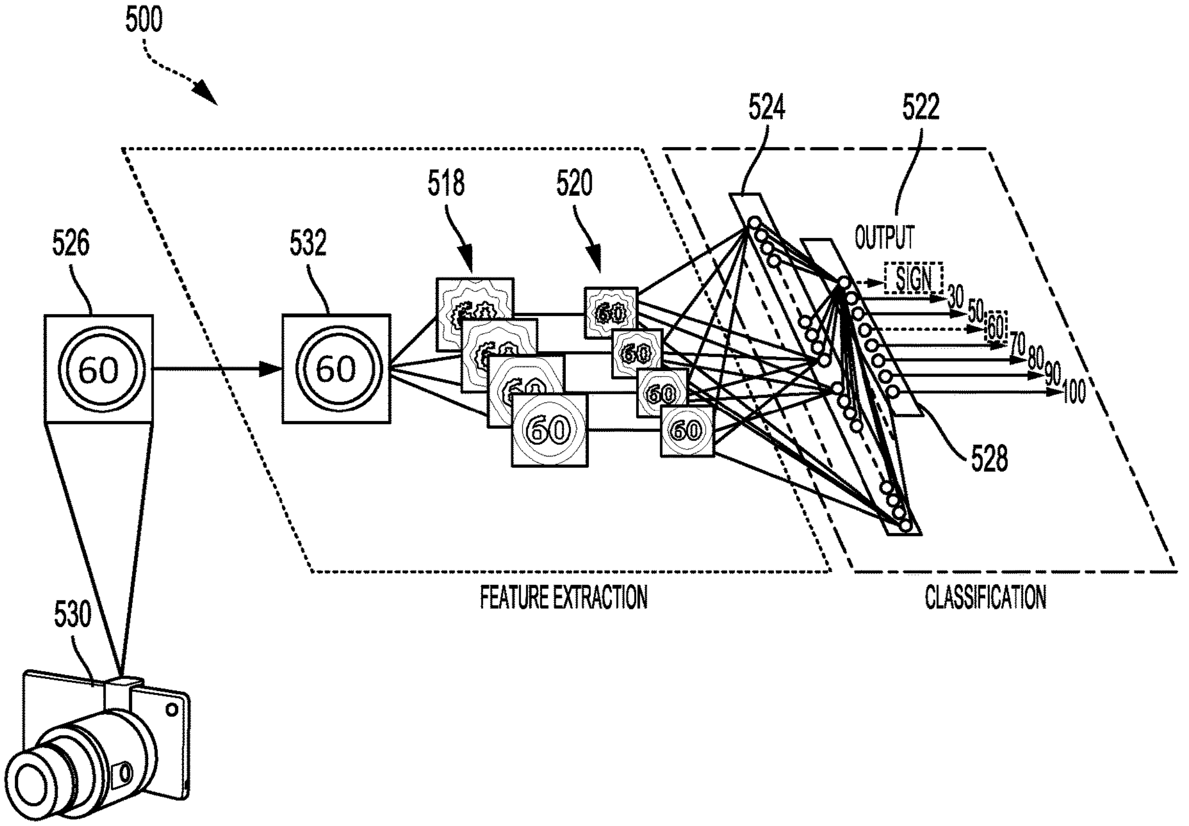
FIG. 5D is a diagram illustrating an exemplary deep convolutional network (DCN), in accordance with various aspects of the present disclosure.

One type of convolutional neural network is a deep convolutional network (DCN). FIG. 5D illustrates a detailed example of a DCN 500 designed to recognize visual features from an image 526 input from an image capturing device 530, such as a car-mounted camera. The DCN 500 of the current example may be trained to identify traffic signs and a number provided on the traffic sign. Of course, the DCN 500 may be trained for other tasks, such as identifying lane markings or identifying traffic lights.

The DCN 500 may be trained with supervised learning. During training, the DCN 500 may be presented with an image, such as the image 526 of a speed limit sign, and a forward pass may then be computed to produce an output 522. The DCN 500 may include a feature extraction section and a classification section. Upon receiving the image 526, a convolutional layer 532 may apply convolutional kernels (not shown) to the image 526 to generate a first set of feature maps 518. As an example, the convolutional kernel for the convolutional layer 532 may be a 5×5 kernel that generates 28×28 feature maps. In the present example, because four different feature maps are generated in the first set of feature maps 518, four different convolutional kernels were applied to the image 526 at the convolutional layer 532. The convolutional kernels may also be referred to as filters or convolutional filters.

The first set of feature maps 518 may be subsampled by a max pooling layer (not shown) to generate a second set of feature maps 520. The max pooling layer reduces the size of the first set of feature maps 518. That is, a size of the second set of feature maps 520, such as 14×14, is less than the size of the first set of feature maps 518, such as 28×28. The reduced size provides similar information to a subsequent layer while reducing memory consumption. The second set of feature maps 520 may be further convolved via one or more subsequent convolutional layers (not shown) to generate one or more subsequent sets of feature maps (not shown).

In the example of FIG. 5D, the second set of feature maps 520 is convolved to generate a first feature vector 524. Furthermore, the first feature vector 524 is further convolved to generate a second feature vector 528. Each feature of the second feature vector 528 may include a number that corresponds to a possible feature of the image 526, such as "sign," "60," and "100." A softmax function (not shown) may convert the numbers in the second feature vector 528 to a probability. As such, an output 522 of the DCN 500 may be a probability of the image 526 including one or more features.

In the present example, the probabilities in the output 522 for "sign" and "60" are higher than the probabilities of the others of the output 522, such as "30," "40," "50," "70," "80," "90," and "100". Before training, the output 522 produced by the DCN 500 may likely be incorrect. Thus, an error may be calculated between the output 522 and a target output. The target output is the ground truth of the image 526 (e.g., "sign" and "60"). The weights of the DCN 500 may then be adjusted so the output 522 of the DCN 500 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN 500 may be presented with new images and a forward pass through the DCN 500 may yield an output 522 that may be considered an inference or a prediction of the DCN 500.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 520) receiving input from a range of neurons in the previous layer (e.g., feature maps 518) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 6:
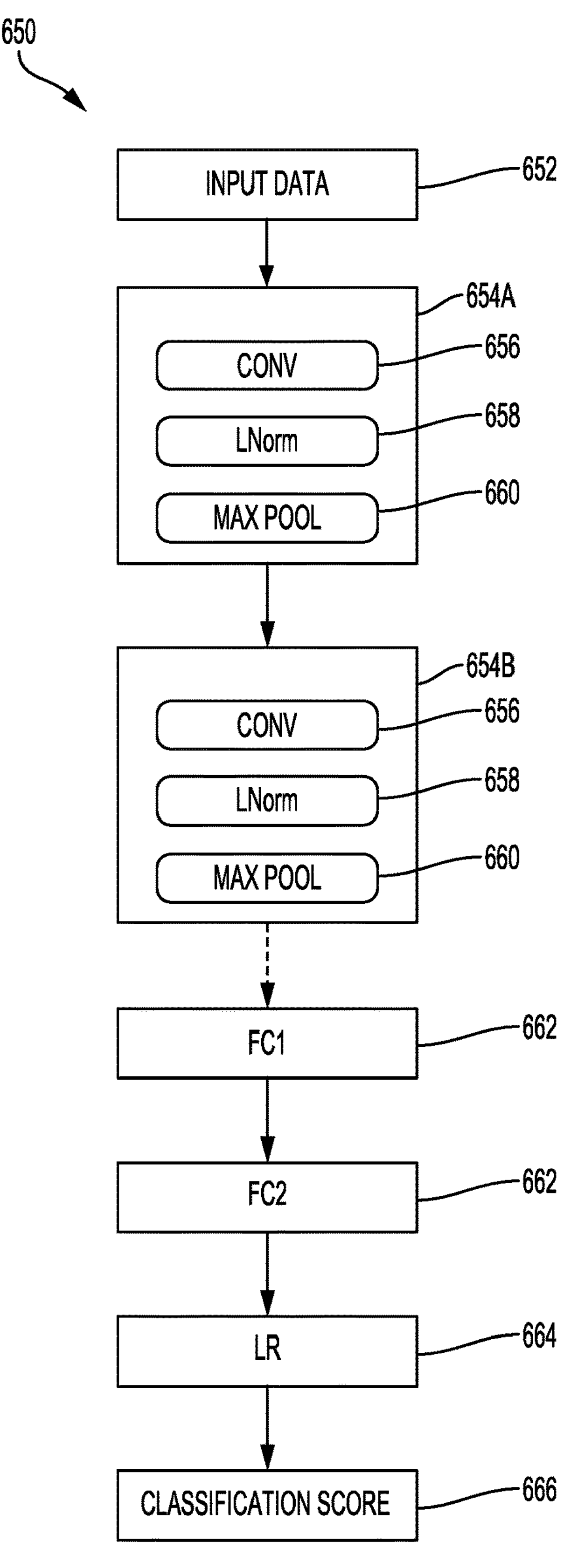
FIG. 6 is a block diagram illustrating an exemplary deep convolutional network (DCN), in accordance with various aspects of the present disclosure.

FIG. 6 is a block diagram illustrating a deep convolutional network (DCN) 650. The DCN 650 may include multiple different types of layers based on connectivity and weight sharing. As shown in FIG. 6, the DCN 650 includes the convolution blocks 654A, 654B. Each of the convolution blocks 654A, 654B may be configured with a convolution layer (CONV) 656, a normalization layer (LNorm) 658, and a max pooling layer (MAX POOL) 660. Although only two of the convolution blocks 654A, 654B are shown, the present disclosure is not so limiting, and instead, any number of the convolution blocks 654A, 654B may be included in the DCN 650 according to design preference.

The convolution layers 656 may include one or more convolutional filters, which may be applied to the input data to generate a feature map. The normalization layer 658 may normalize the output of the convolution filters. For example, the normalization layer 658 may provide whitening or lateral inhibition. The max pooling layer 660 may provide down sampling aggregation over space for local invariance and dimensionality reduction.

The parallel filter banks, for example, of a deep convolutional network may be loaded on a CPU 102 or GPU 104 of an SoC 100 (e.g., FIG. 1) to achieve high performance and low power consumption. In alternative embodiments, the parallel filter banks may be loaded on the DSP 106 or an ISP 116 of an SoC 100. In addition, the DCN 650 may access other processing blocks that may be present on the SoC 100, such as sensor processor 114 and navigation module 120, dedicated, respectively, to sensors and navigation.

The DCN 650 may also include one or more fully connected layers 662 (FC1 and FC2). The DCN 650 may further include a logistic regression (LR) layer 664. Between each layer 656, 658, 660, 662, 664 of the DCN 650 are weights (not shown) that are to be updated. The output of each of the layers (e.g., 656, 658, 660, 662, 664) may serve as an input of a succeeding one of the layers (e.g., 656, 658, 660, 662, 664) in the DCN 650 to learn hierarchical feature representations from input data 652 (e.g., images, audio, video, sensor data and/or other input data) supplied at the first of the convolution blocks 654A. The output of the DCN 650 is a classification score 666 for the input data 652. The classification score 666 may be a set of probabilities, where each probability is the probability of the input data including a feature from a set of features.

Figure 7:
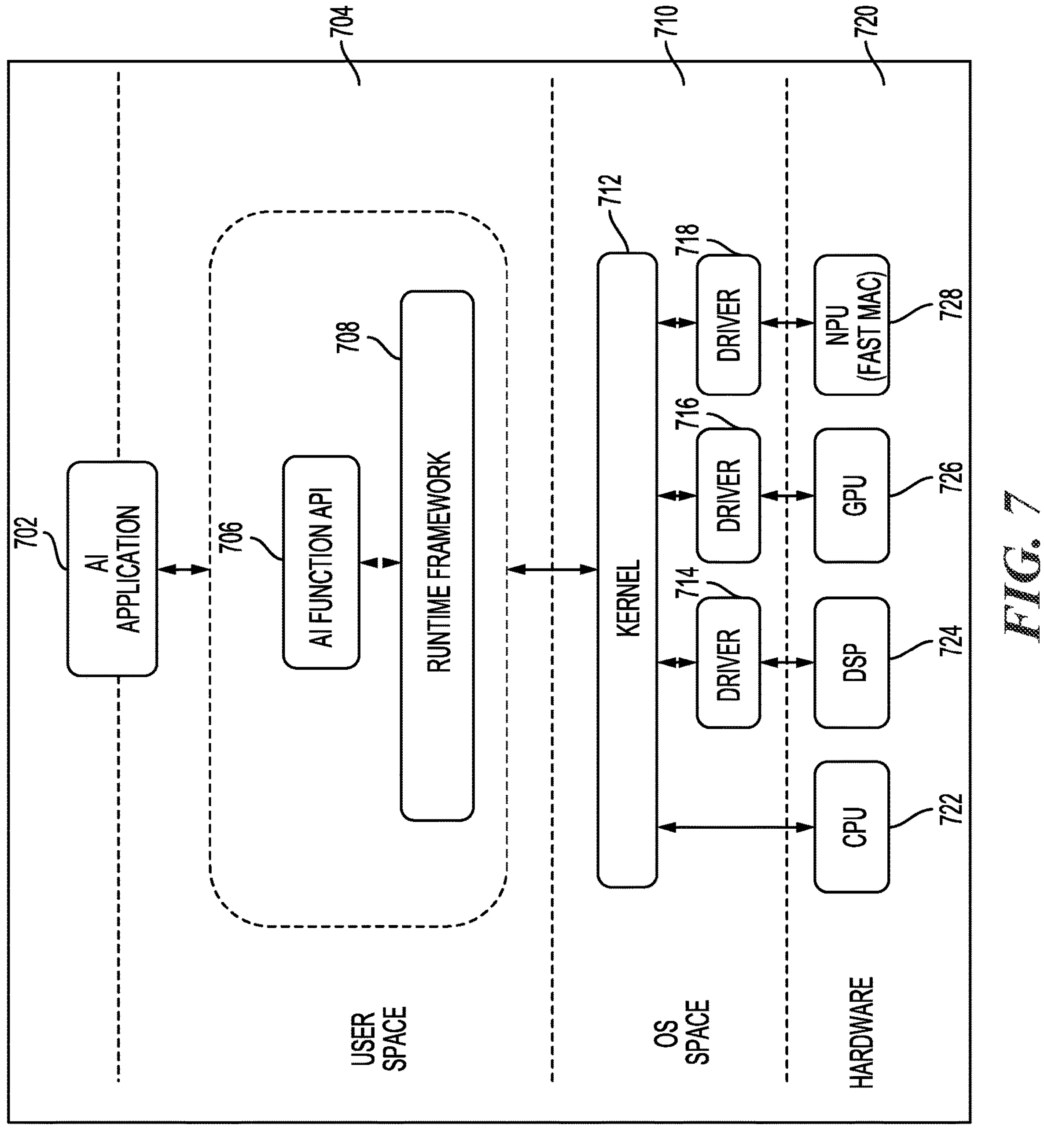
FIG. 7 is a block diagram illustrating an exemplary software architecture that may modularize artificial intelligence (AI) functions, in accordance with various aspects of the present disclosure.

FIG. 7 is a block diagram illustrating an exemplary software architecture 700 that may modularize artificial intelligence (AI) functions. Using the architecture 700, applications may be designed that may cause various processing blocks of an SoC 720 (for example, a CPU 722, a DSP 724, a GPU 726 and/or an NPU 728) to support power multiplexor control by an AI application 702, according to aspects of the present disclosure. The architecture 700 may, for example, be included in a computational device, such as a smartphone or AR glasses.

The AI application 702 may be configured to call functions defined in a user space 704 that may, for example, provide for the detection and recognition of a scene indicative of the location at which the computational device including the architecture 700 currently operates. The AI application 702 may, for example, configure a microphone and a camera differently depending on whether the recognized scene is an office, a lecture hall, a restaurant, or an outdoor setting such as a lake. The AI application 702 may make a request to compiled program code associated with a library defined in an AI function application programming interface (API) 706. This request may ultimately rely on the output of a deep neural network configured to provide an inference response based on video and positioning data, for example.

The run-time engine 708, which may be compiled code of a runtime framework, may be further accessible to the AI application 702. The AI application 702 may cause the run-time engine 708, for example, to request an inference at a particular time interval or triggered by an event detected by the user interface of the AI application 702. When caused to provide an inference response, the run-time engine 708 may in turn send a signal to an operating system in an operating system (OS) space 710, such as a kernel 712, running on the SoC 720. In some examples, the kernel 712 may be a LINUX Kernel. The operating system, in turn, may cause a continuous relaxation of quantization to be performed on the CPU 722, the DSP 724, the GPU 726, the NPU 428, or some combination thereof. The CPU 722 may be accessed directly by the operating system, and other processing blocks may be accessed through a driver, such as a driver 714, 716, or 718 for, respectively, the DSP 724, the GPU 726, or the NPU 728. In the exemplary example, the deep neural network may be configured to run on a combination of processing blocks, such as the CPU 722, the DSP 724, and the GPU 726, or may be run on the NPU 728.

For wider market adoption, augmented reality (AR) glasses should be, lightweight with a small form factor (e.g., sleek form factor). In fact, original equipment manufacturers (OEMs) may specify maximum dimension limits to achieve the sleek form factor. The sleek form factor, however, restricts chip count, chip package size, battery size, and battery capacity. The printed circuit board (PCB) inside the side arm drives the overall product size. The main system-on-a-chip (SoC) and power management integrated circuit (PMIC) package size dictate the overall PCB size on each arm. To achieve dimension targets, only one PMIC with associated passive devices can be placed on the PCB due to a Y-dimension limit. Moreover, lower power consumption may improve the user experience by allowing a lower battery capacity and resulting smaller battery.

For next generation augmented reality chips, the SoC feature set is increasing. The PCB size specifications, however, are very stringent. In fact, the SoC package size specification will decrease over time, forcing a PMIC size reduction. With the increased feature set, power consumption of each core device and associated power rail will correspondingly increase, which in turn requires additional power supplies or regulators. To provision more regulators, either multiple PMICs are added or a larger single PMIC is introduced. Both solutions increase the PCB Y-dimension, which is detrimental for sleek glasses.

Figure 8:
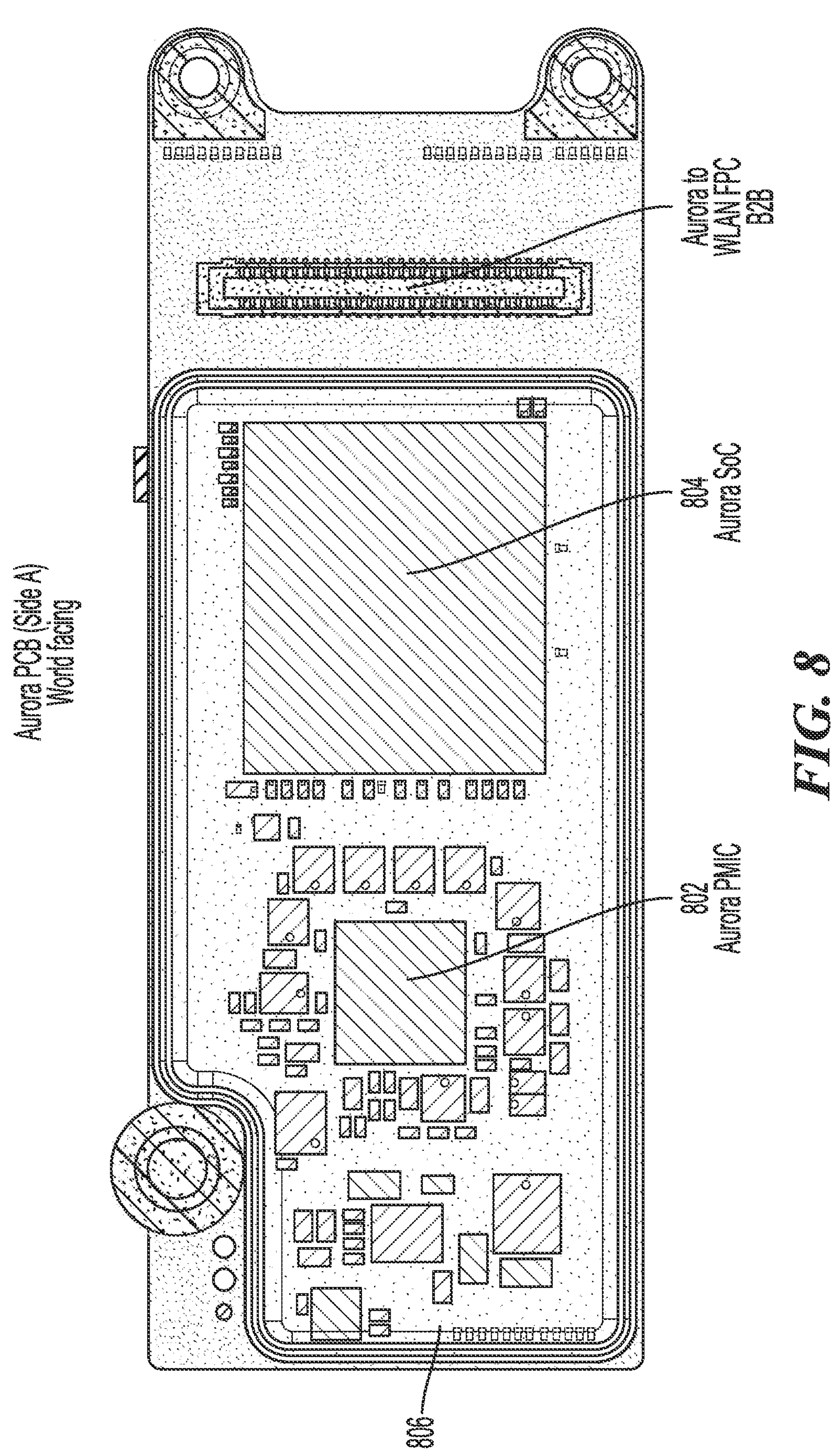
FIG. 8 is a diagram illustrating an augmented reality printed circuit board (PCB), in accordance with various aspects of the present disclosure.

FIG. 8 is a diagram illustrating an augmented reality printed circuit board (PCB), in accordance with aspects of the present disclosure. In the example of FIG. 8, an augmented reality PMIC 802 (e.g., Aurora PMIC) and an augmented reality SoC 804 (e.g., Aurora SoC) are provided on a PCB 806.

Figure 9:
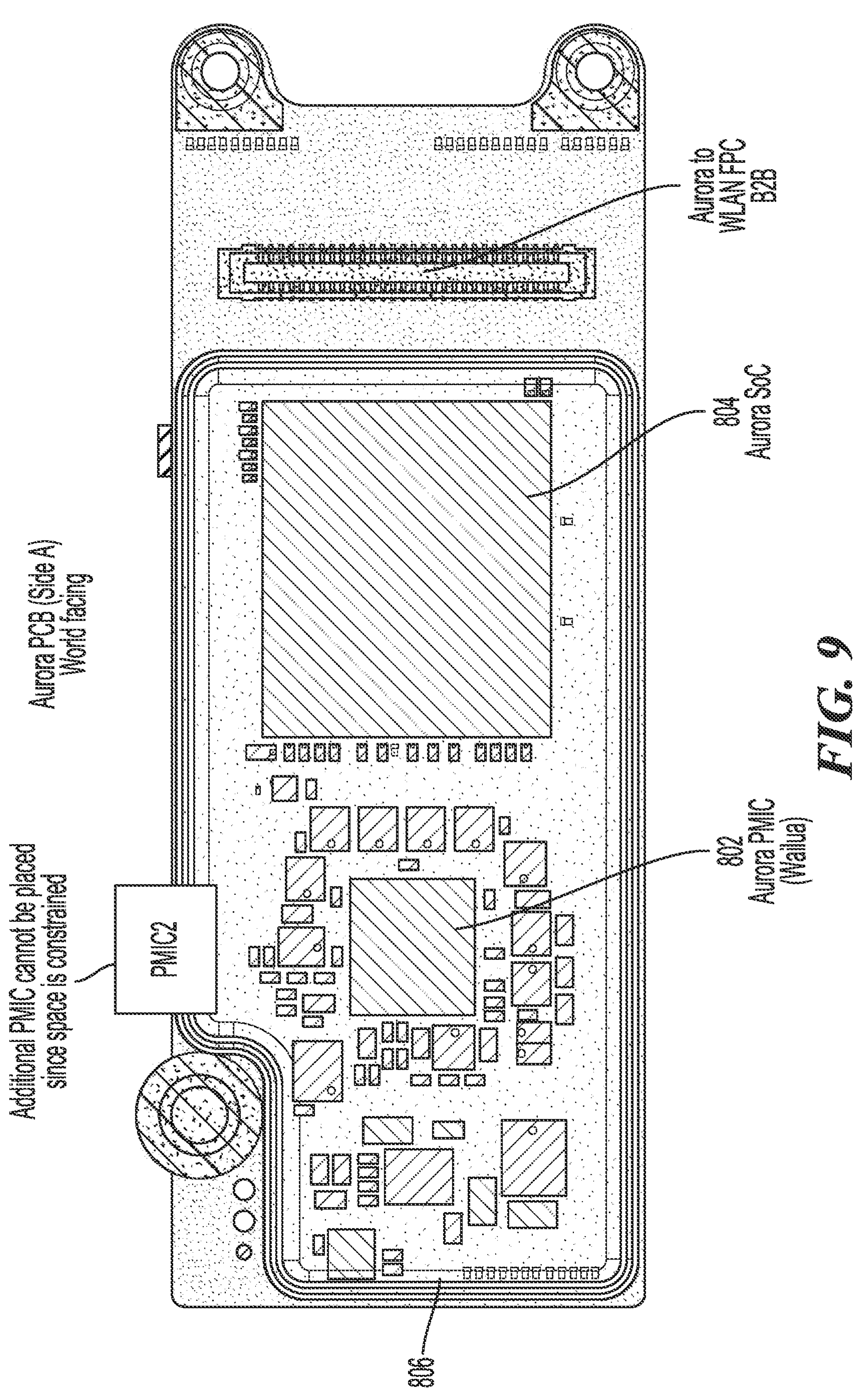
FIG. 9 is a diagram illustrating limitations of an augmented reality printed circuit board (PCB), in accordance with various aspects of the present disclosure.

FIG. 9 is a diagram illustrating limitations of an augmented reality printed circuit board (PCB), in accordance with aspects of the present disclosure. As seen in the example of FIG. 9, because the space on the PCB is limited, an additional PMIC (PMIC2) cannot be placed on the PCB 806.

Instead of adding a PMIC, the cores may be throttled to limit the peak current. Throttling the cores, however, will impact user experience. Another option to achieve lower power for small batteries is to split each rail into multiple rails, which again increases the regulator requirement and PCB area. It would be desirable to deliver the peak current required to achieve full performance with low power consumption, without increasing a number of regulators and PCB area.

Figure 10:
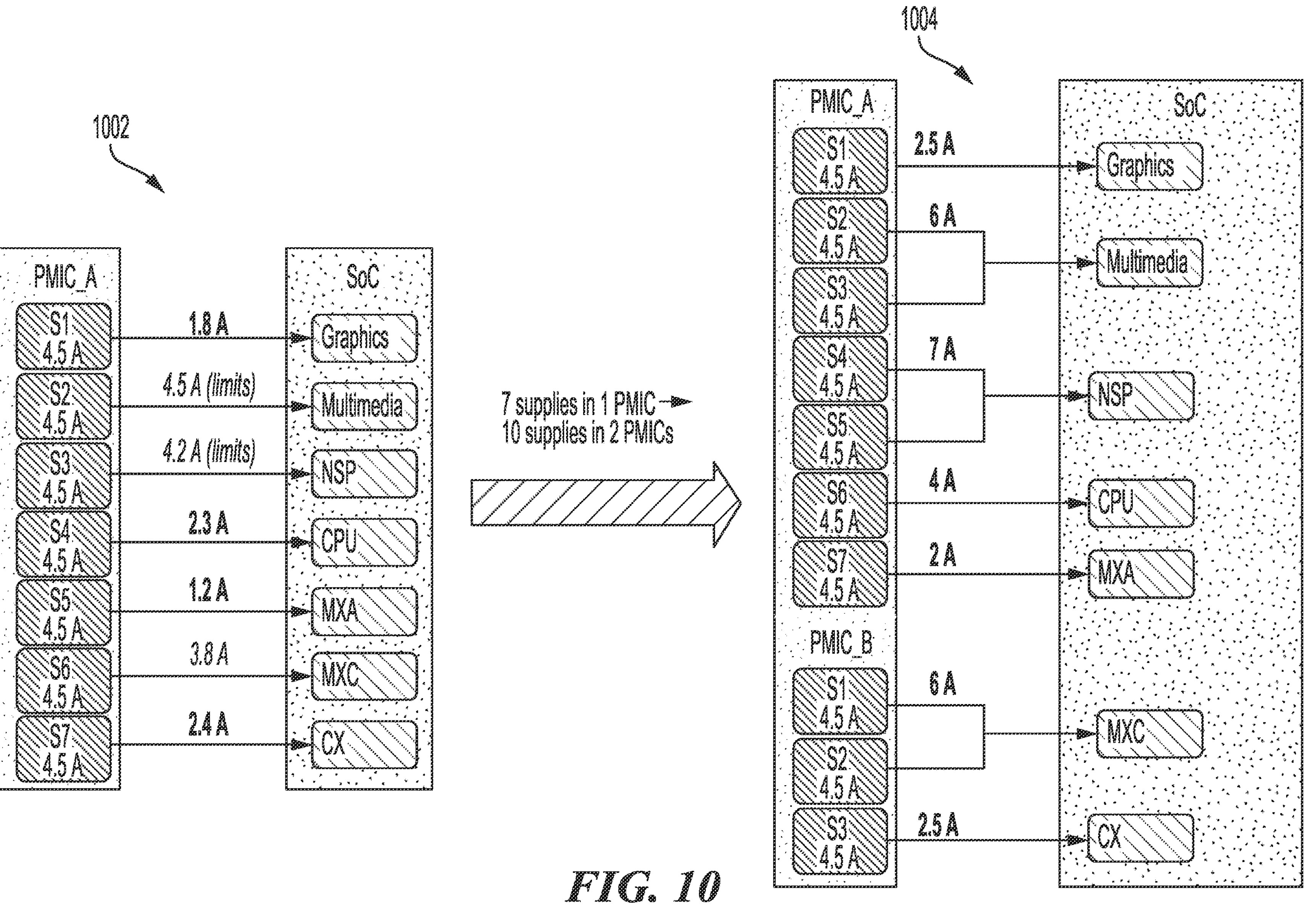
FIG. 10 is a diagram illustrating augmented reality power grids.

FIG. 10 is a diagram illustrating augmented reality power grids. In the example of FIG. 10, an augmented reality power grid 1002 has some power supplies (e.g., switched-mode power supplies (SMPSs) or low drop out (LDO) regulators (not shown)) that are close to their current limit. A multimedia core device draws 4.5 amps (A) from a second power supply S2, which has a 4.5 A limit. A neural signal processor (NSP) draws 4.2 A, which is near the 4.5 A limit of a third power supply S3. A collapsible memory rail (MXC) draws 3.8 A from a sixth power supply S6, which is near its 4.5 A limit. Other power supplies are under-utilized. A graphics core draws 1.8 A from a first power supply S1, which has a 4.5 A limit. A central processing unit (CPU) core draws 2.3 A from a fourth power supply S4, which has a 4.5 A limit. An always-on memory rail (MXA) draws 1.2 A from a fifth power supply S5, which has a 4.5 A limit. A core logic rail (CX) draws 2.4 A from a seventh power supply S7, which has a 4.5 A limit.

Although the term 'core' is primarily used throughout the description, the term 'rail' may be used interchangeably if the meaning of the sentence is not changed.

Augmented reality (AR) chips will see generational upgrades in cores such as graphics cores, multimedia cores, NSP cores, and static random access memory (SRAM). New cores with higher performance require higher peak current, and hence may specify multiple SMPS phases (or phases of another type of power supply). More SMPS phases results in more PMICs or a single larger PMIC resulting in larger PCB area. In one example, an AR power grid 1004 includes seven power supplies (e.g., buck regulators) in a first PMIC, PMIC_A, and three power supplies in a second PMIC, PMIC_B. In this example, each power supply has a 4.5 A limit. The fourth and fifth power supplies, S4, S5, as well as the second and third power supplies, S2, S3, in the first PMIC, PMIC_A, are dual phase power supplies providing 7 A and 6 A, respectively, to the NSP core device and the multimedia core device. In the second PMIC, PMIC_B, the first and second power supplies, S1, S2, are dual phase SMPSs providing 6 A to the MXC. The first power supply S1 of the first PMIC, PMIC_A, and the third power supply, S3, of the second PMIC, PMIC_B, provide 2.5 A to the graphics core and the CX rail, respectively. The sixth and seventh power supplies, S6, S7 provide 4 A and 2 A, respectively, to the CPU core and the MXA rail. However, as noted above, the additional phases and extra PMIC increase the size of the PCB, making it difficult to achieve a sleek form factor for a wearable device (e.g., AR glasses). Although certain peak current values are provide in this example, the disclosure is not so limited.

Figure 11A:
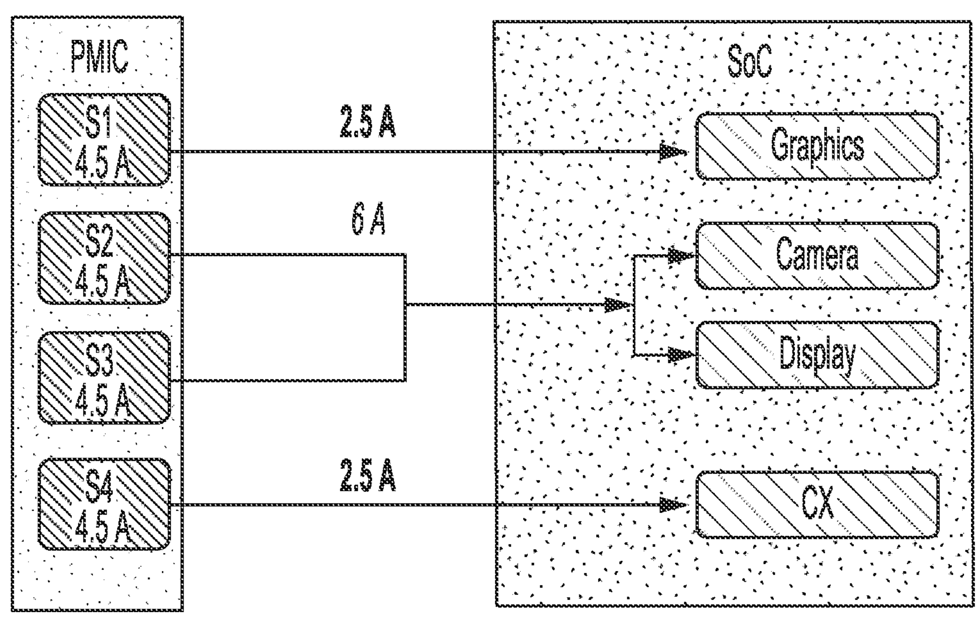
FIG. 11A is a diagram illustrating an augmented reality power grid with an additional phase.
Figure 11B:
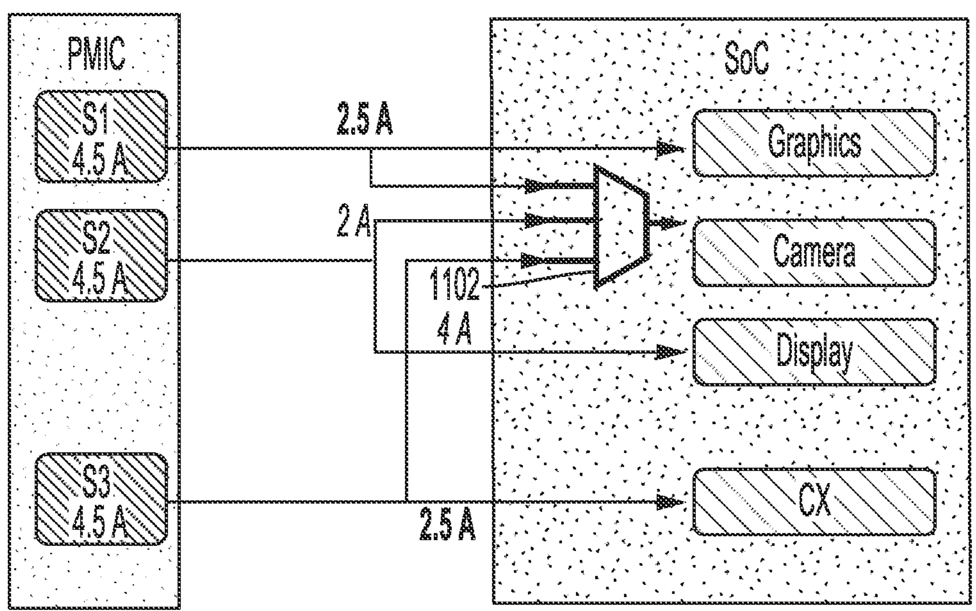
FIG. 11B is a diagram illustrating a dynamic power grid, in accordance with aspects of the present disclosure.

According to aspects of the present disclosure, during peak current loading on a specific rail or from a specific core device, instead of adding more power supplies (e.g., SMPS phases as shown in FIG. 11A), the current capacity from under-utilized power supplies is used, as shown in FIG. 11B. FIG. 11A is a diagram illustrating an augmented reality power grid with an additional phase. FIG. 11B is a diagram illustrating a dynamic power grid, in accordance with aspects of the present disclosure. In the example of FIG. 11A, the power supplies S2 and S3 represent two phases providing 6 A to the camera and display cores of the multimedia rail. The graphics core and CX rail each receive 2.5 A from the first and fourth power supplies, S1 and S4, respectively.

In FIG. 11*i*, a power multiplexor (MUX) 1102 is provided to select the power supply (e.g., SMPS phase or LDO regulator) to power specific cores/rails when overall peak current for all cores/rails exceeds the rated capacity. In the example of FIG. 11, the power MUX 1102 selectively receives, as input, power from all three power supplies, S1, S2, and S3. The output of the power MUX 1102 is coupled to the camera core. In the example of FIG. 11B, the graphics core and CX rail receive 2.5 A from the first and third power supplies, S1 and S3, respectively. The display core receives 4 A from the second power supply, S2. The camera core selectively receives some combination of 2.5 A from the third power supply, S3, 2.5 A from the first power supply, S1, and/or 2 A from the second power supply, S2.

In some scenarios, under-utilized power supplies may be present. Based on utilization, the power MUX 1102 intelligently selects the correct power input, S1, S2, and/or S3. Accordingly, the power multiplexor control decisions are based on a machine learning process that accepts multiple inputs such as: present load currents of all power supplies, present operating voltages of all power supplies, the specified core/rail voltage, and a days of use (DoU) (or power) model. Final power supply selection via the power multiplexor ensures the load current specifications are met and power is optimized. Because MUX selection is based on a group of inputs, a machine learning model may be employed.

Advantages of the proposed solution include elimination of additional power supply phases for powering cores with higher feature sets. Thus, the PCB area does not increase, even though the capacity has increased. Moreover, full performance of the cores is achieved without using limits management or adding additional phases, preventing a negative impact to the user experience. Additionally, power improvements enable smaller batteries. In a shared rail system, the power multiplexing can achieve lower power consumption by switching cores to low voltage power supply. A rock bottom sleep current (RBSC) can be reduced by moving cores which are kept ON in system-on-a-chip (SoC) sleep to a power supply that is turned OFF.

Figure 12A:
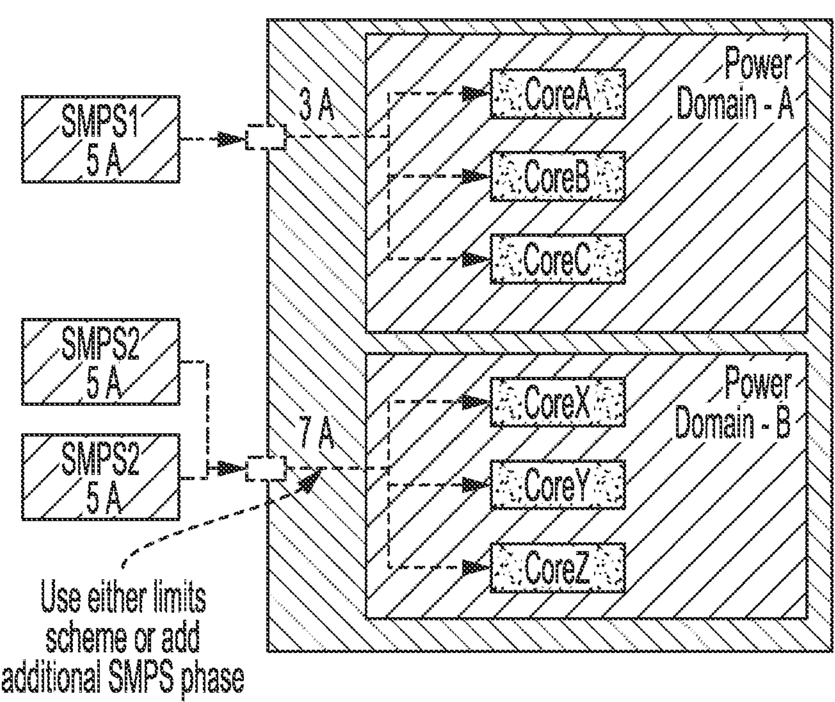
FIG. 12A is a diagram illustrating an augmented reality power grid with an additional phase.

According to aspects of the present disclosure, a MUX is employed for power distribution. Traditionally, to meet load current requirements, additional power supply phases will be added if single phase capacity is not sufficient. FIG. 12A is a diagram illustrating an augmented reality power grid with an additional phase. In the example of FIG. 12A, a first power supply, SMPS1, is limited to 5 A and provides 3 A to a first power domain, power domain A, including core A, core B, and core C. Second and third power supplies, SMPS2 and SMPS3, include an additional SMPS phase, with each phase limited to 5 A. The second and third power supplies, SMPS2 and SMPS3, provide 7 A to a second power domain, power domain B, including core X, core Y, and core Z. Although not shown, in FIG. 12A, a limits management scheme may be employed, instead of the additional phase to address the current overload of the second and third power supplies, SMPS2 and SMPS3.

Figure 12B:
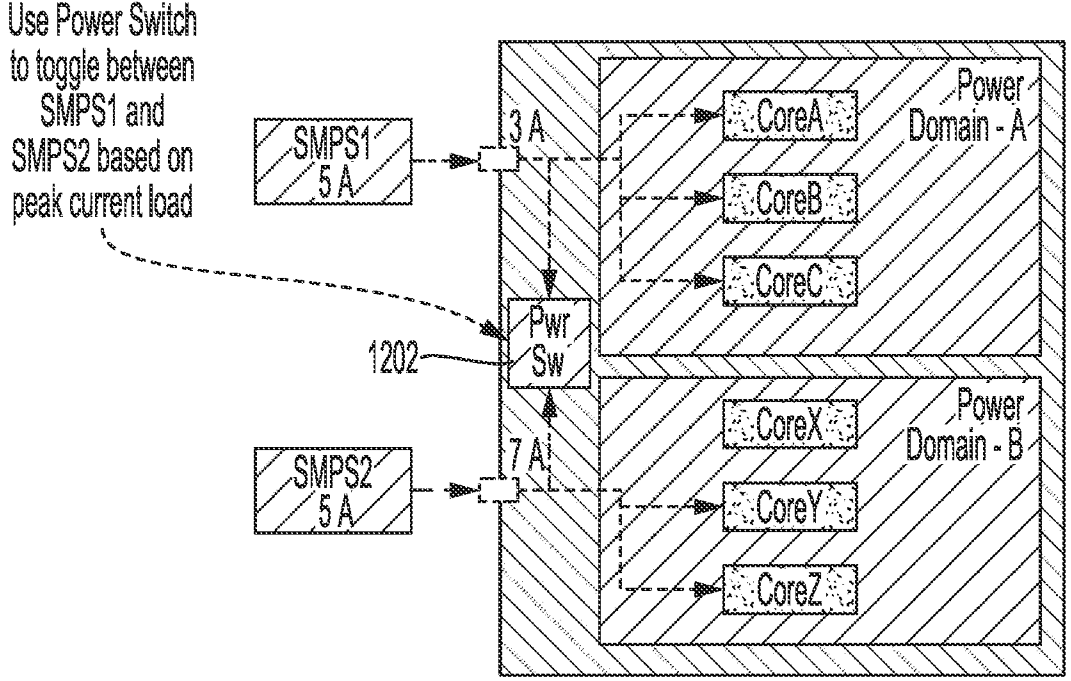
FIG. 12B is a diagram illustrating a dynamic power grid with a power multiplexor, in accordance with various aspects of the present disclosure.

By using a power MUX, a load can draw current from different regulators based on which regulator can supply the full current specified by the load. FIG. 12B is a diagram illustrating a dynamic power grid with a power multiplexor, in accordance with aspects of the present disclosure. In the example of FIG. 12B, a power multiplexor (MUX) (also referred to as a power switch) 1202 is provided. The power MUX 1202 receives input from the first and second power supplies, SMPS1 and SMPS 2. The current required by the second power domain, power domain B, is 7 A, which exceeds the 5 A limit of the second power supply, SMPS2. CoreX of the second power domain, power domain B, receives power via the power MUX 1202. The power MUX 1202 toggles between the first and second power supplies, SMPS1 and SMPS 2, based on the peak current load. These aspects employ the power MUX 1202 to deliver the peak current requirement of load by utilizing under-loaded SMPSs, and deliver the peak current requirement without adding additional phases.

According to aspects of the present disclosure, machine learning facilitates MUX switching. Because there may be many regulators that are under-loaded at any point in time, the machine learning module decides which regulator is the best to deliver current at a given point in time. The machine learning module can accept multiple inputs and outputs which regulator to use to deliver the peak current required.

Figure 13:
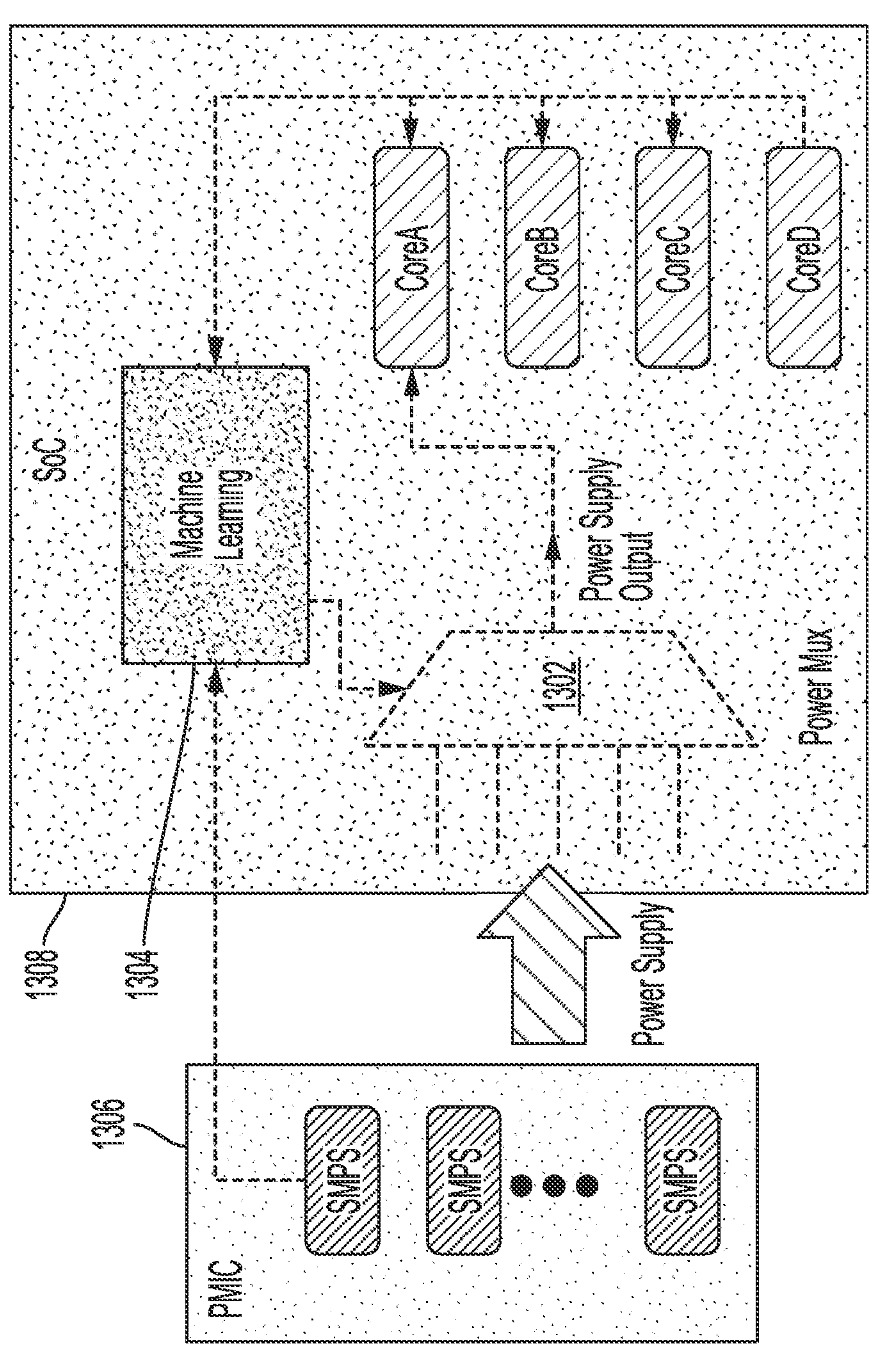
FIG. 13 is a diagram illustrating a dynamic power grid with a machine learning controlled power multiplexor, in accordance with various aspects of the present disclosure.

FIG. 13 is a diagram illustrating a dynamic power grid with a machine learning controlled power multiplexor, in accordance with aspects of the present disclosure. In the example of FIG. 13, a power multiplexor (MUX) 1302 receives a control signal from a machine learning module 1304. The machine learning module 1304 controls MUX selection based on a variety of inputs. Exemplary input to the machine learning module 1304 include each regulator's present voltage and current loading, the core/rail current requirements, and a power model (e.g., a DoU model) to estimate power loss or advantage. The power model estimates the power consumed based on the current use case. The power MUX 1302 receives power from power supplies (e.g., SMPSs or LDO regulators (not shown)) in a PMIC 1306. The power MUX 1302 provides power to a first core, core A, in this example. The cores, core A, core B, core C, and core D, along with the machine learning module 1304 and the power MUX 1302 all reside in an SoC 1308, for example, an augmented reality SoC.

Constraints for the machine learning module 1304 may include meeting the peak current requirement. Moreover, the DoU or power model impact should be minimal. In some examples, the machine learning module 1304 outputs a MUX select signal.

According to aspects of the present disclosure, full performance is achieved with a limited number of power supply phases. In prior systems, when the peak current exceeded the power supply limit, either an additional power supply was provisioned, or performance was throttled to keep the peak current within the limit. Instead of throttling cores, the techniques of the present disclosure intelligently power the core to achieve full performance without additional regulators. With the proposed techniques, unused power supply power will be utilized to power the cores to achieve full performance.

Figure 14:
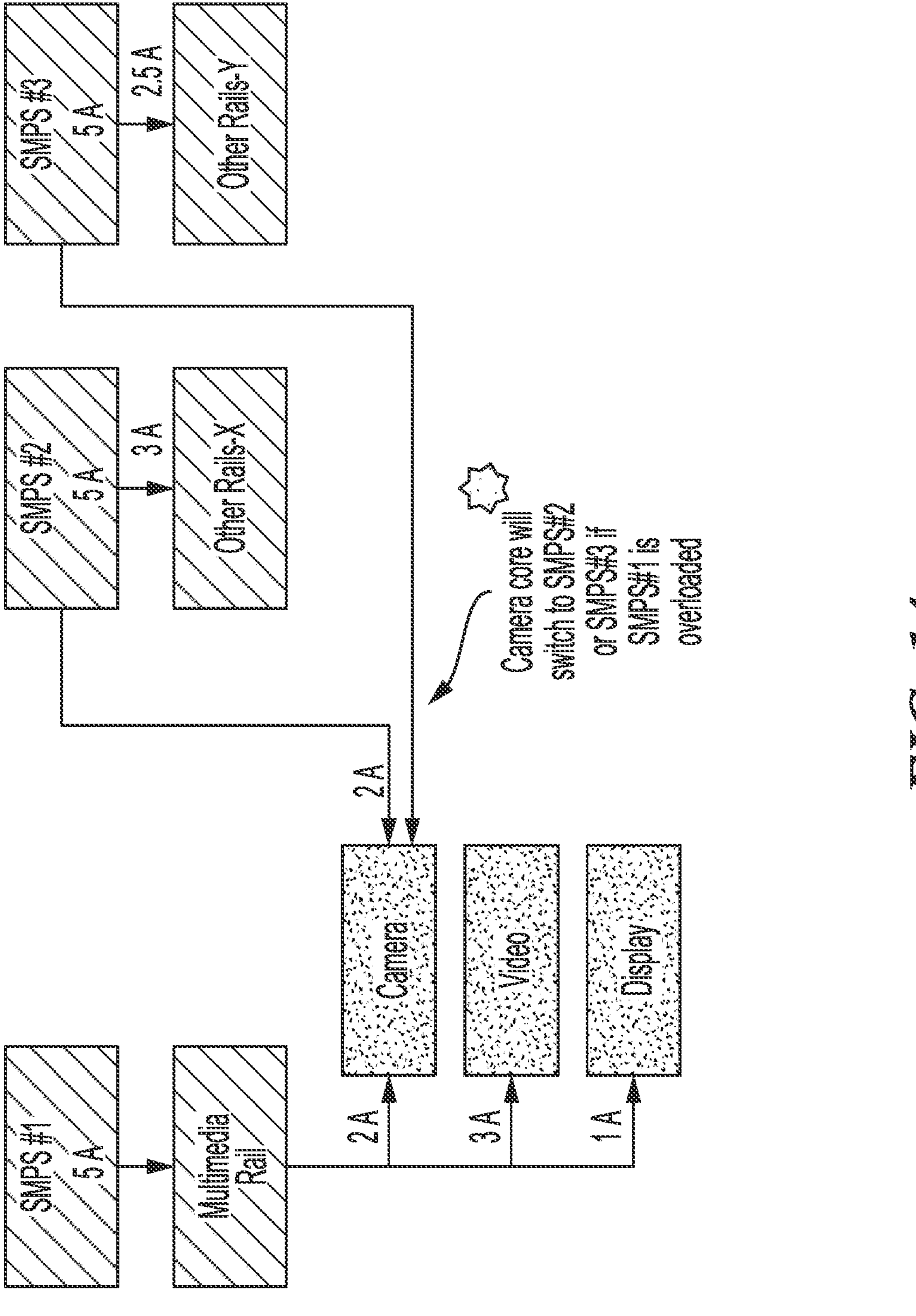
FIG. 14 is a diagram illustrating a dynamic power grid for switching between power supplies in an overloaded condition, in accordance with various aspects of the present disclosure.

FIG. 14 is a diagram illustrating a dynamic power grid for switching between power supplies in an overloaded condition, in accordance with aspects of the present disclosure. In the example of FIG. 14, three power supplies, SMPS1, SMPS2, and SMPS 3, each have a 5 A current limit. A camera core draws 2 A, a video core draws 3 A, and a display core draws 1 A. Because the total current specified by the cores exceeds the 5 A limit of the first power supply, SMPS1, the camera core switches to either the second power supply, SMPS2, or the third power supply, SMPS3. The second power supply, SMPS2, is supplying 3 A to other rails, whereas the third power supply, SMPS3, is supplying 2.5 A to other rails. Consequently, the second power supply, SMPS2, and the third power supply, SMPS3, are each under-utilized.

According to aspects of the present disclosure, a power model is employed as part of the machine learning model. In a shared rail system, each core may specify a different voltage for operation. If one of the cores on a power rail specifies higher voltage, all cores on the same rail will run at the higher voltage, thereby impacting the power consumption. Improved power efficiency can be achieved if a core device moves from a higher voltage supply to a lower voltage supply. Depending on the voltage requirement of each core, the core supply can be moved to an under-loaded power supply or a power supply with lower voltage to reduce DoU impact. Aspects of the present disclosure use a power MUX to dynamically switch cores to a lower voltage power supply to achieve lower power consumption.

Figure 15:
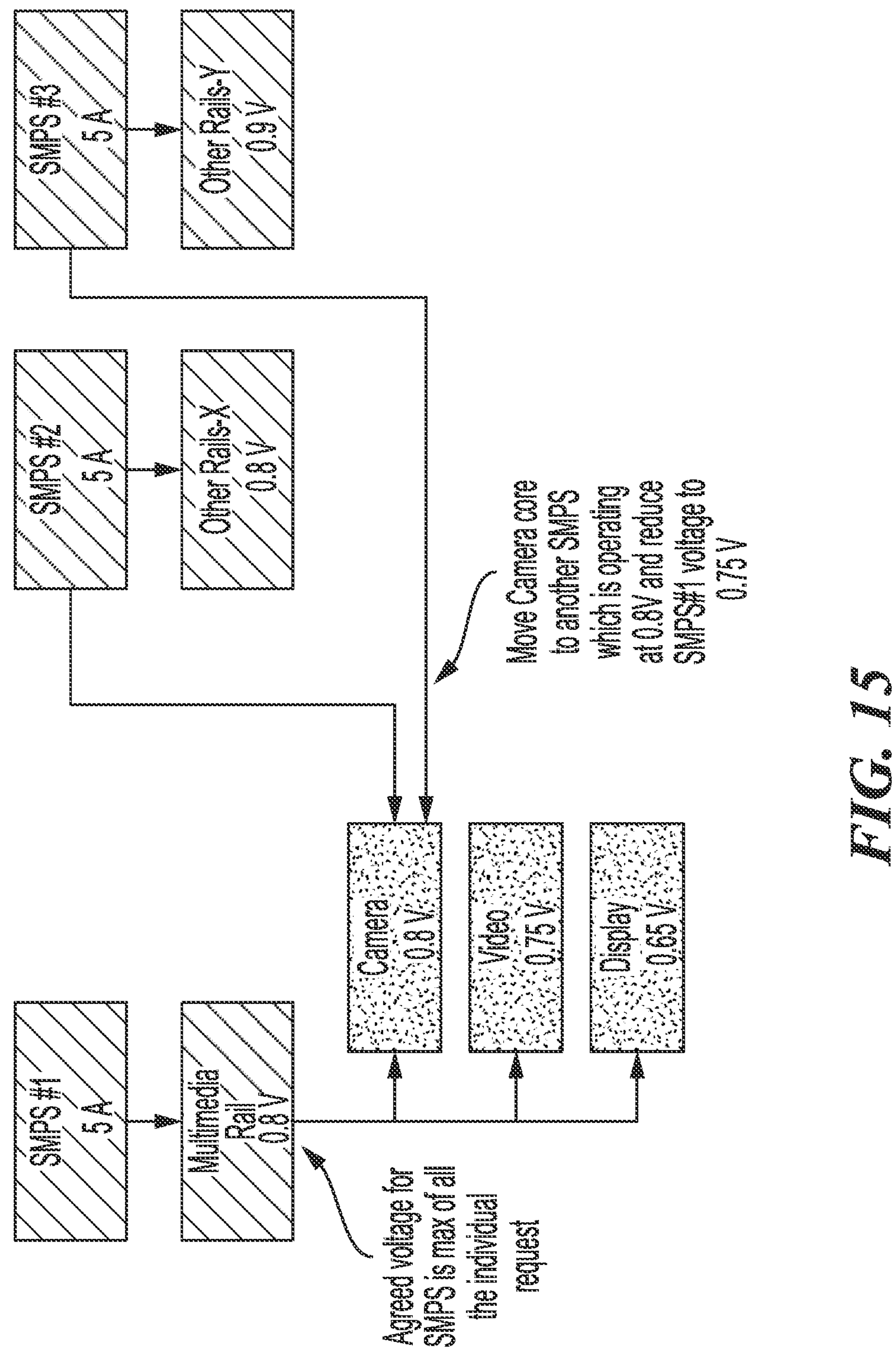
FIG. 15 is a diagram illustrating a dynamic power grid for switching between power supplies to reduce power consumption, in accordance with various aspects of the present disclosure.

FIG. 15 is a diagram illustrating a dynamic power grid for switching between power supplies to reduce power consumption, in accordance with aspects of the present disclosure. In the example of FIG. 15, a multimedia rail requires 0.8 V, which is an agreed voltage for the associated power supply based on a maximum specification of all individual cores on the multimedia power rail. In the example of FIG. 15, the camera core operates at 0.8 V, whereas the video and display cores operate at 0.75 V and 0.65 V, respectively. By moving the camera core to another power supply that is operating at 0.8 V, the voltage for the first power supply, SMPS1, can be reduced to 0.75 V. In the example of FIG. 15, the second and third power supplies, SMPS2 and SMPS3, operate at 0.8 V and 0.9 V, respectively. Thus, both the second and third power supplies, SMPS2 and SMPS3, are candidates for supplying the camera rail.

According to further aspects of the present disclosure, rock bottom sleep current (RBSC) savings can be achieved by moving the cores that are not required to be powered ON to a power supply that is turned OFF. In a shared rail system, even if one of the cores can be powered OFF, because the main rail is kept at minimum voltage to retain data (e.g., retention voltage), there will be leakage current. Switching the rail that can be collapsed to a power supply that is OFF can provide RBSC savings.

Figure 16:
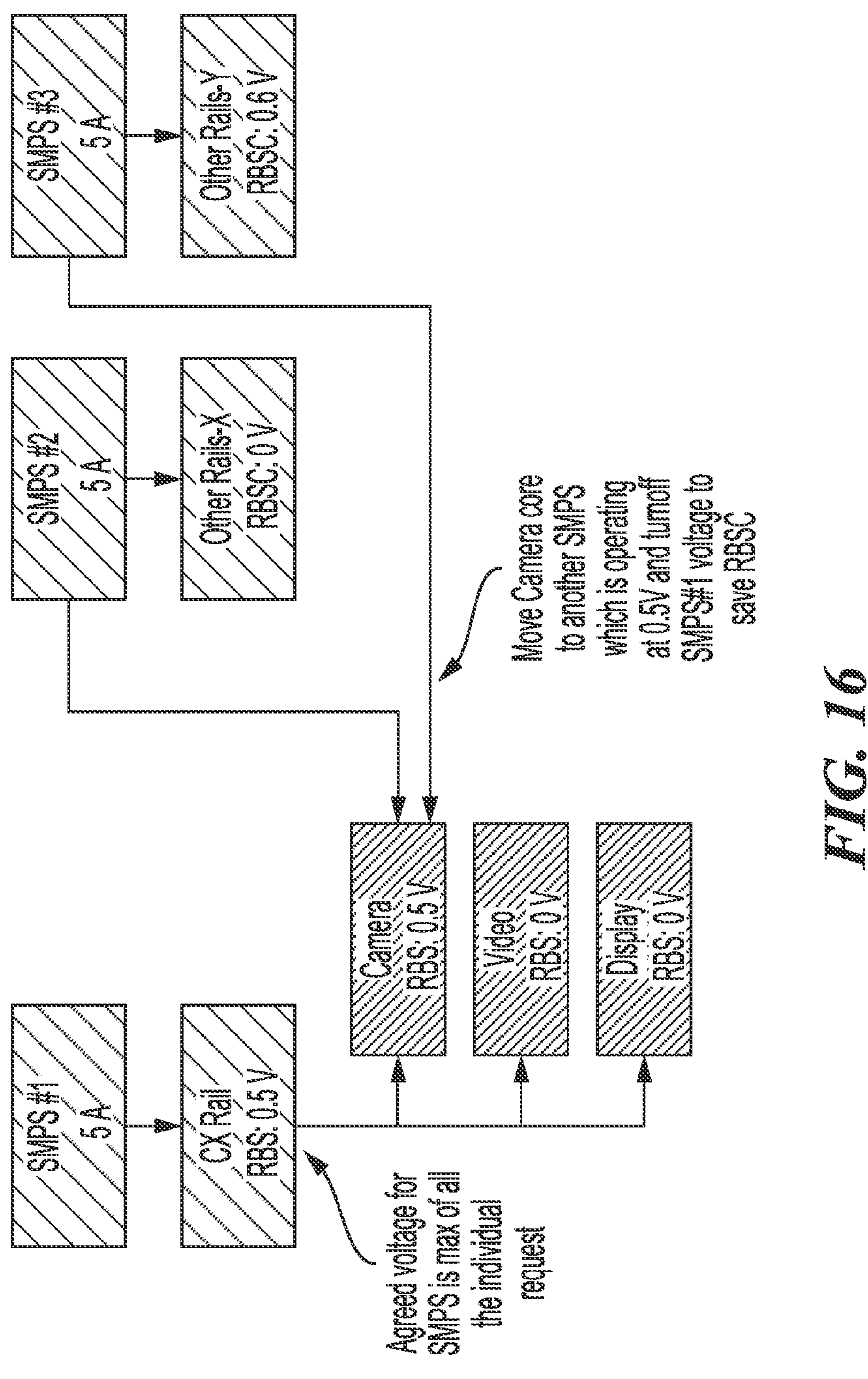
FIG. 16 is a diagram illustrating a dynamic power grid for switching between power supplies for a power collapsed core, in accordance with various aspects of the present disclosure.

FIG. 16 is a diagram illustrating a dynamic power grid for switching between power supplies for a power collapsed core, in accordance with aspects of the present disclosure. In the example of FIG. 16, the CX rail operates at 0.5 V, which is the agreed voltage for the first power supply, SMPS1, based on the maximum specified voltage for all cores associated with the CX rail. If the video and display cores go to sleep and thus operate at 0 V in their rock bottom sleep (RBS) mode, the camera core may move to another power supply that is operating at 0.5 V or a higher voltage. Consequently, the first power supply, SMPS1, can be turned OFF to save rock bottom sleep current.

An example operation will now be described with respect to FIG. 11B. In this example, the multimedia peak current exceeds the 4.5 A limit. That is, the multimedia core requires 6 A when operating the camera core (drawing 2 A) concurrently with the display core (drawing 4 A). The second power supply, S2, has a 4.5 A capacity. Instead of introducing an additional phase to meet the current specifications, the power MUX 1102 is added, which accepts input from the power supplies, S1, S2, and S3, that are already available in the PMIC. When a multimedia intensive use case is triggered, if the estimated load current exceeds the 4.5 A power supply limit, the machine learning module (e.g., 1304 shown in FIG. 13) decides to switch the input for the camera core from the second power supply, S2, to either the first power supply, S1, or the third power supply, S3. Both the first and third power supplies, S1 and S3, have sufficient capacity to meet the 2 A current requirement from the camera core. Depending on which use case is currently running and the voltage of the first and third power supplies, S1 and S3, the machine learning module switches to one of the first and third power supplies, S1 and S3. Assume the first power supply, S1, is operating at 0.7 V, the third power supply, S3, is operating at 0.9 V, and the camera core requires 0.65 V. Under these assumptions, the machine learning module will switch the camera core power source to the first power supply, S1, because this power supply provides the required current at the lowest required voltage. Without any throttling of cores, full performance of the multimedia cores is realized.

Another example operation will now be described with respect to FIG. 11B. In this example, power consumption is more optimal. In the example of FIG. 11B, it is assumed that there is no peak current loading on any power supplies because of a specific use case. It is also assumed that the camera core requires 0.9 V to operate, and the display rail needs only 0.75 V. The second power supply, S2, runs at 0.9 V and hence, the display core power consumption increases power consumption of the entire SoC. If either the first or third power supply, S1 or S3, is operating at 0.9 V or greater, the camera core can switch to either the first or third power supply, S1 or S3. The second power supply voltage can be reduced to 0.75 V, which is required by the display core. The power consumption of the display core is therefore more optimal. The power consumption of the camera core is constantly monitored, and the core switches between power supplies, S1, S2, or S3, depending on which power supply provides the optimal power benefit.

Another example operation will now be described with respect to FIG. 17. In this example, rock bottom sleep current (RBSC) is optimized. In a system where multiple cores are powered by a single rail, even if one core needs to be ON in RBS state, the entire rail will be kept ON. This impacts the RBSC because the core that can be kept OFF will leak current. In such cases, if the core that can be kept OFF is moved to a power supply that is OFF using the power MUX, the leakage impact will be reduced.

Figure 17:
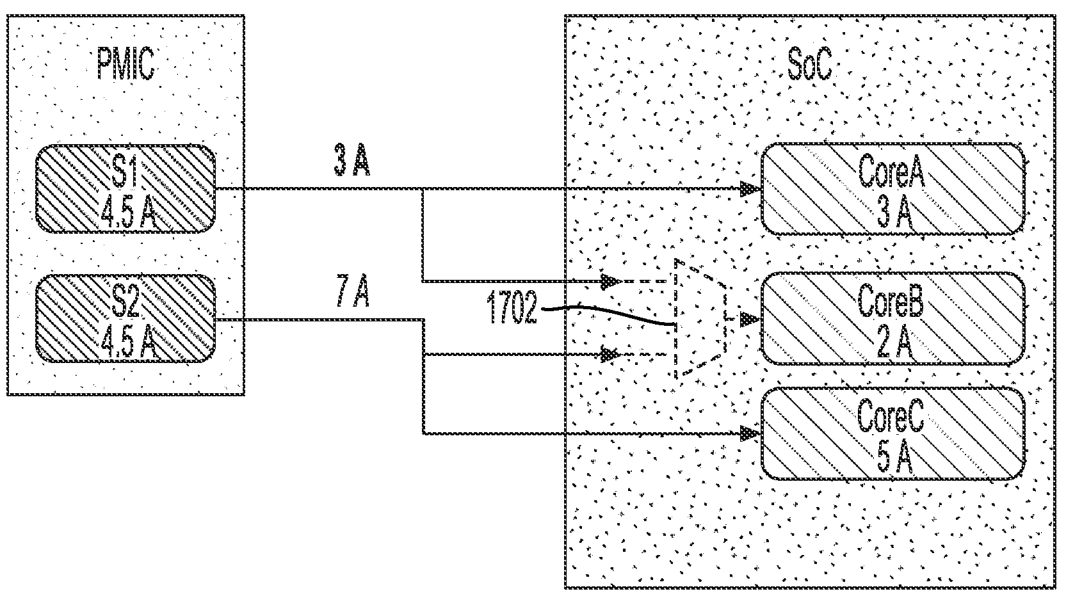
FIG. 17 is a diagram illustrating a dynamic power grid for switching between power supplies to reduce power consumption, in accordance with various aspects of the present disclosure.

FIG. 17 is a diagram illustrating a dynamic power grid for switching between power supplies to reduce power consumption, in accordance with aspects of the present disclosure. In FIG. 17, core B and core C share the same rail. In this example, core A and core B can be turned OFF in RBS mode, and core C needs to remain ON. Because core C is ON, core B will also be kept ON and hence leakage increases. By moving core B with the power MUX 1702 to the first power supply, S1, which is OFF, the RBSC is reduced.

Figure 18:
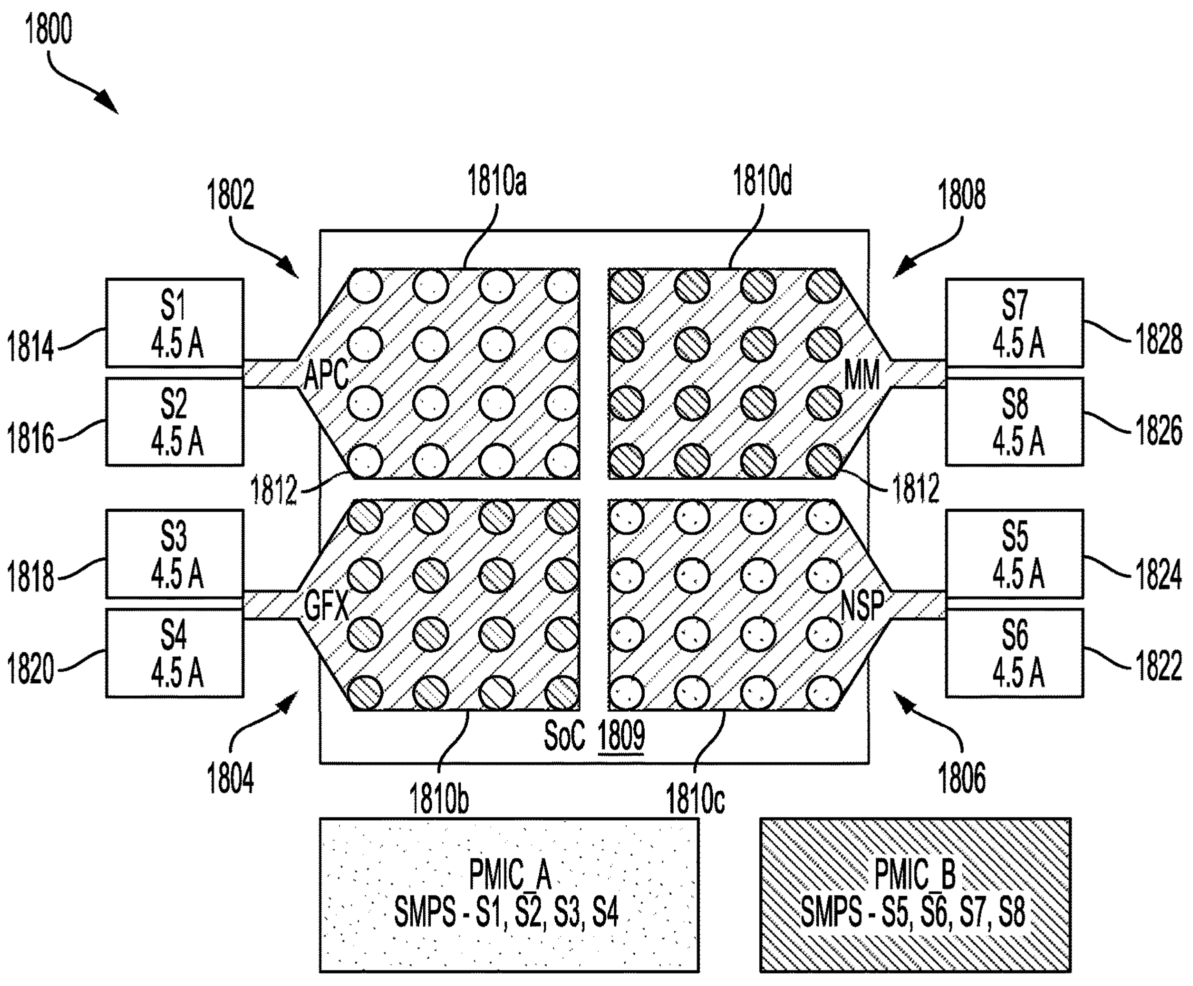
FIG. 18 is a diagram illustrating a conventional power grid design.

FIG. 18 is a diagram illustrating a conventional power grid design. The power grid 1800 may be implemented on a PCB, such as the PCB illustrated with respect to FIGS. 8 9. As shown in FIG. 18, the power grid 1800 may comprise a group of power supplies 1814, 1816, 1818, 1820, 1822, 1824, 1826, and 1828. Each power supply may be an SMPS, such as a step-down converter (e.g., buck regulator). The power supplies illustrated in FIG. 18 may each provide up to 4.5 amps (A) of current. The power grid 1800 may also include a group of core devices 1802, 1804, 1806, and 1808 on an SoC 1809. In the example illustrated in FIG. 18, the core device 1802 is an application processor core (APC), the core device 1804 is a graphics core, the core device 1806 is an NSP, and the core device 1808 is a multimedia core. In some aspects, the APC may be analogous to a CPU. Each pair of power supplies provides power to one of the four core devices 1802, 1804, 1806, and 1808. Specifically, each pair of core devices provides power to a PCB power plane 1810*a*, 1810*b*, 1810*c*, or 1810*d*. Because each power supply may provide up to 4.5 amps of current, and there are two power supplies coupled to each core device, each core device in the power grid 1800 may draw up to 9 amps of current. The voltage of each power supply is set based on a frequency requirement of the associated core device.

Each PCB power plane 1810*a-d* comprises a group of package interconnects 1812, such as package balls of a ball grid array (BGA). The package interconnects 1812 couple a PCB power plane to a core device. For example, the power supplies 1822 and 1824 provide power to the PCB power plane 1810*c*. The package interconnects 1812 couple the PCB power plane 1810*c* to the core device 1806. The power supplies 1822 and 1824 provide power to the core device 1806 via the PCB power plane 1810*c* and package interconnects 1812. Although the example illustrated in FIG. 18 comprises an APC, graphics core, NSP, and multimedia core, the cores may comprise other compute engines, such as those illustrated in FIG. 1.

As shown in FIG. 18, each core device receives power via a group of two power supplies. In some examples, each core device may be powered by a multi-phase power supply. In other examples, some core devices may be powered by a single-phase power supply, e.g., some core devices may draw power from only one power supply. Regardless of the number of power supplies, each power supply on the power grid 1800 is dedicated to one core device. Further, the power grid 1800 may comprise any number of PMICs. The example power grid 1800 illustrated in FIG. 18 comprises two PMICs, where four power supplies are coupled to PMIC_A and four power supplies are coupled to PMIC_B.

Figure 19:
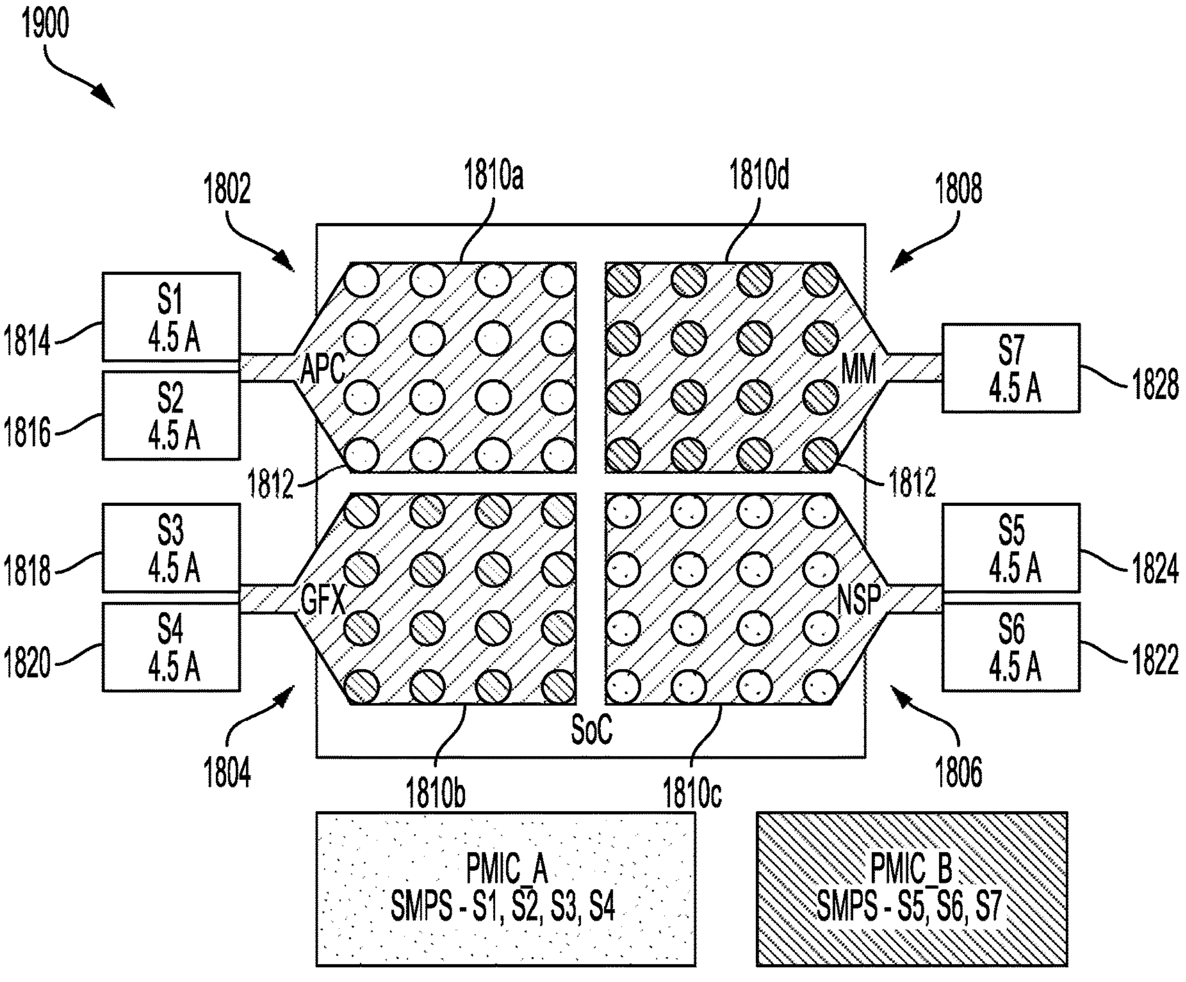
FIG. 19 is a diagram illustrating a conventional power scheme with limit management.

FIG. 19 is a diagram illustrating a conventional power scheme with limit management. The power grid 1900 illustrated in FIG. 19 is similar to the power grid 1800 illustrated in FIG. 18, except that the power grid 1900 comprises only seven power supplies. Specifically, the core device 1808 is powered by only one power supply 1828. The other core devices 1802, 1804, and 1806 are each powered by two power supplies.

As discussed with regard to FIG. 10, it is difficult to achieve a sleek form factor while maintaining multiple power supplies per core device. As a result, conventional power grids, such as the power grid 1900, preserve PCB area by limiting the number of available power supplies. Because of the limited number of power supplies, the core device 1808 is left with only one power supply, limiting available power to 4.5 amps. In scenarios where the core device 1808 may draw more than 4.5 amps of current, the core device 1808 is throttled, reducing both the power consumption and the performance of the core device 1808.

The power grid 1800 and power grid 1900 are subject to several drawbacks. First, the power grids often underutilize power supplies. The power supply per core device ratio is based on peak current scenarios. During the device's active operation, however, some power supplies may be unused. Second, each power supply occupies PCB area. Increasing the number of power supplies increases the amount of PCB area by increasing PMIC count or PMIC size. Third, core devices with limited power supplies occasionally are throttled to reduce power draw, affecting device performance.

FIG. 20 is a table illustrating voltage level thresholds. Each core device power rail may have multiple voltage levels based on the operation voltage frequency of the power rail. Voltage levels may also be referred to as voltage corners. Power grids may implement multiple voltage levels to reduce overall power consumption by the device. For example, a power rail may be set to a lower voltage level to reduce power consumption of the power rail.

In the example illustrated in FIG. 20, a core logic rail (CX) voltage may operate at one of eight operation voltage levels or at a retention voltage level. A higher core frequency may specify a higher voltage level. For example, a 1 gigahertz (GHz) frequency may specify the core logic rail to operate at the turbo voltage level. In the table illustrated in FIG. 20, the "Functional" column lists different exemplary naming conventions for each voltage threshold. The "SS," "TT," and "FFG" columns of FIG. 20 illustrate core logic rail voltage process corners. The naming convention for the process corners illustrated in FIG. 20 generally uses two-letter designators, where the first letter refers to the n-channel metal-oxide-semiconductor logic (NMOS) corner, and the second letter refers to the p-channel metal-oxide-semiconductor (PMOS) corner. For example, a core voltage rail operating at a Turbo_L1 voltage level may operate at a slow-slow (SS) process corner, or 0.904 volts. Core voltage rails may additionally operate at a typical-typical (TT) process corner or a fast-fast global (FFG) process corner.

In practice, each core device may operate at a different voltage level based on the frequency of operation specified for a use case. In AR power grid designs, because power consumption is especially important, each core device may be designed to operate in one of several active low voltage levels, such as LowSVS, static voltage scaling (SVS), or SVS_L1.

Figure 21:
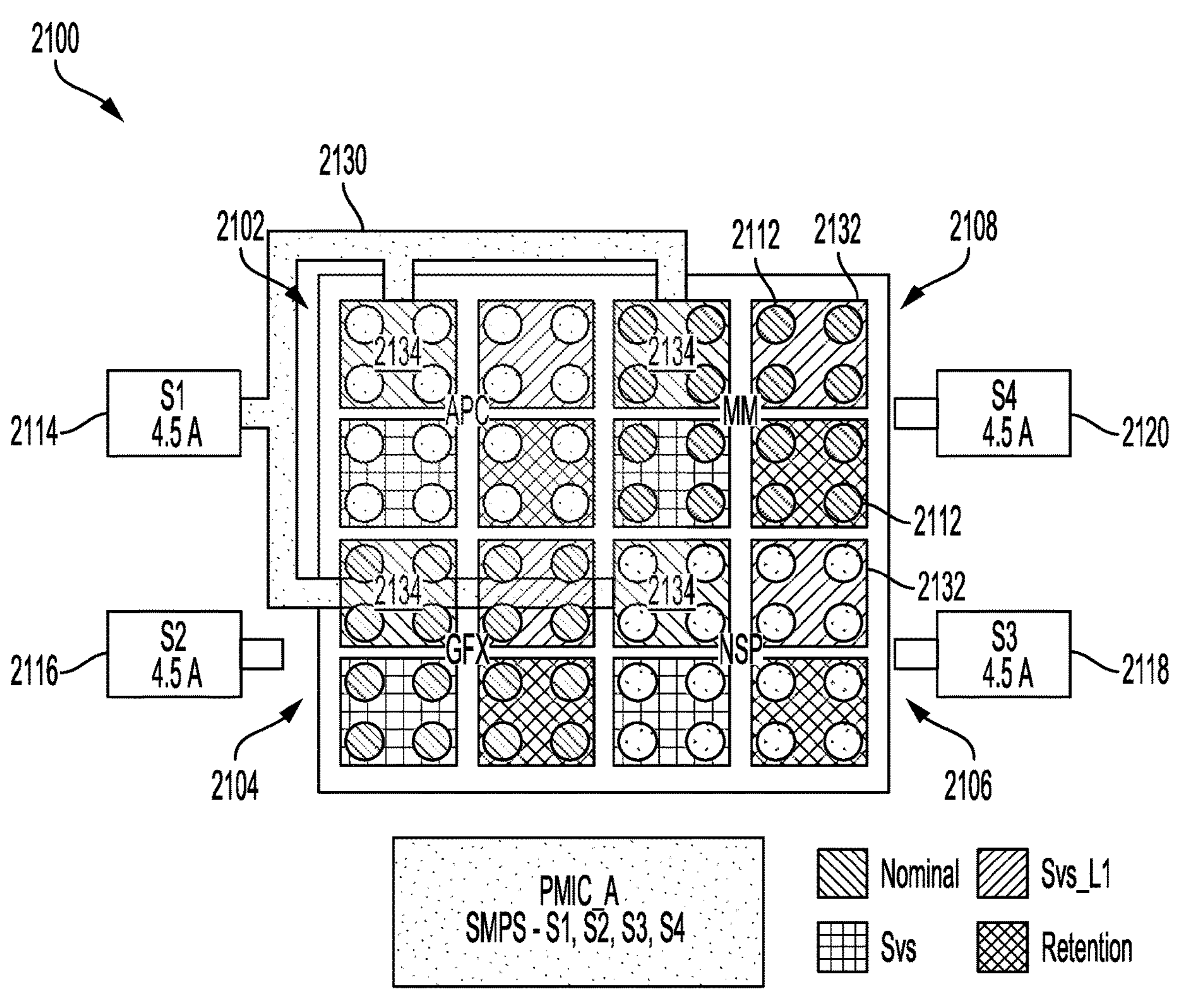
FIG. 21 is a diagram illustrating a first improved power grid, according to various aspects of the present disclosure.

FIG. 21 is a diagram illustrating a first improved power grid 2100, according to various aspects of the present disclosure. As illustrated in FIG. 21, the improved power grid 2100 may comprise four power supplies, 2114, 2116, 2118, and 2120. Each power supply 2114-2118 is coupled to a power rail 2130. For example, the power supply 2114 is coupled to the power rail 2130. The other power supplies 2116, 2118, and 2120 are also coupled to power rails not illustrated in FIG. 21, each power supply coupled to a separate power rail. The improved power grid 2100 may have multiple package interconnects 2112. The package interconnects 2112 may be grouped into groups of four, although any other number is also contemplated. In the example of FIG. 21, each core device 2102, 2104, 2106, 2108 has four groups of package interconnects 2132, 2134 or sixteen package interconnects 2112 per core device. Each power rail may be coupled to one dedicated group of package interconnects 2132, 2134 for each core device 2102-2108. For example, the power rail 2130 may be coupled to the groups of package interconnects 2134 for the APC 2102, graphics core 2104, NSP 2106, and multimedia core 2108, as illustrated in FIG. 21. In some aspects, each power supply in the improved power grid 2100 may be on one PMIC, such as PMIC_A illustrated in FIG. 21. In other aspects, the improved power grid 2100 may comprise multiple PMICs, each PMIC comprising one or more power supplies.

Each power supply may operate at a different voltage level. The available voltage levels may be predetermined. For example, the power supplies may be configured to operate at the voltage levels illustrated in FIG. 20. In the example illustrated in FIG. 21, the power supply 2114 operates at a nominal voltage level. Although the specific voltage levels for each remaining power supply 2116, 2118, and 2120 are not illustrated, the example illustrated in FIG. 21 has one of the power supplies operating at a retention voltage level, one operating at the SVS voltage level, and one operating at the SVS_L1 voltage level.

As discussed, each power supply in FIG. 21 powers a power rail that is coupled to each core device. Because each power supply is coupled to each core device via a power rail, each power supply 2114, 2116, 2118, and 2120 may provide current to each core device 2102, 2104, 2106, and 2108. For example, the power supply 2118 is coupled to each core device 2102, 2104, 2106, and 2108, although not explicitly shown in FIG. 21.

Each group of package interconnects 2132, 2134 is coupled to a core device such that each power supply may selectively provide current to one or more of the core devices. For example, the power supplies 2114, 2116, 2118, 2120 coupled to the APC 2102 are each selectively coupled to the APC 2102 such that any or none of the power supplies 2114, 2116, 2118, 2120 may provide current to the APC 2102. To facilitate the power supply selection, a switch (not illustrated) may be implemented to selectively couple each power supply to each core device. The switch may be provided at different locations. In some aspects, the switch may be located within the PMIC. For example, a switch located within a PMIC may toggle the connection between the power supply 2118 and the graphics core 2104. In other aspects, the switch may be located on the PCB outside of the PMIC.

Because each power supply is selectively coupled to each core device via a switch, each core device may receive current from multiple power supplies. For example, if each power supply 2114, 2116, 2118, 2120 provides up to 4.5 amps of current, then each core device 2102, 2104, 2106, 2108 may receive up to 18 amps of current.

Each power supply may operate at any voltage level. In some aspects, each power supply 2114, 2116, 2118, and 2120 may operate at different voltage levels. For example, the power supply 2114 may operate at a nominal voltage level, the power supply 2116 may operate at an SVS_L1 voltage level, the power supply 2118 may operate at a retention voltage level, and the power supply 2120 may operate at an SVS voltage level. In other aspects, some power supplies may operate at the same voltage level. For example, the power supply 2116 and power supply 2118 may both operate at a nominal voltage level.

Although the example illustrated in FIG. 21 shows four power supplies, the improved power grid 2100 may have more or fewer than four power supplies. In some aspects, more than one power supply may be coupled to each power rail. For example, a second power supply, other than the power supply 2114, may be coupled to the power rail 2130. In one implementation, the improved power grid 2100 has six power supplies, each power supply coupled to one of six groups of package interconnects 2132 per core device.

Figure 22:
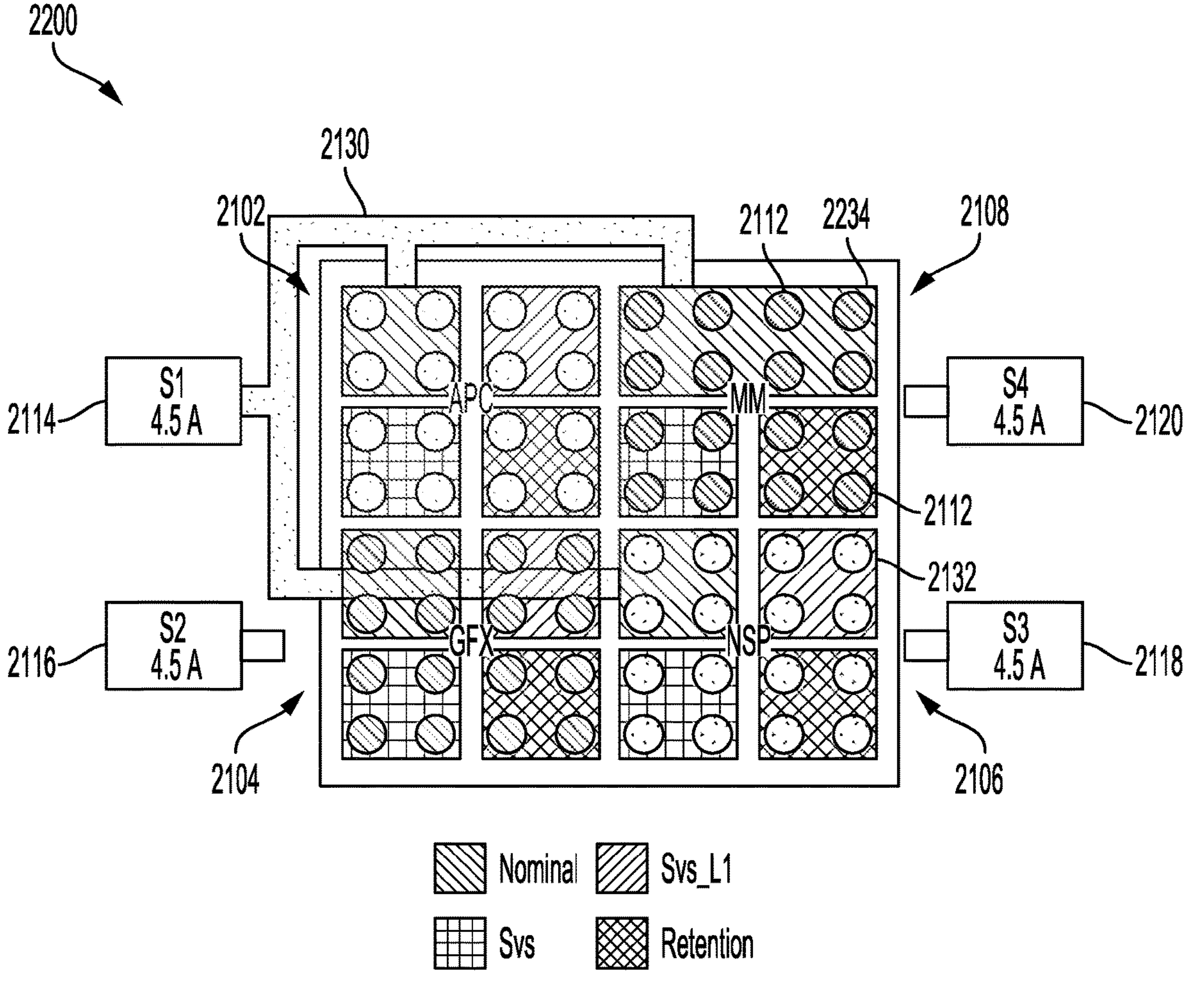
FIG. 22 is a diagram illustrating a second improved power grid, according to various aspects of the present disclosure.

FIG. 22 is a diagram illustrating a second improved power grid 2200, according to various aspects of the present disclosure. The second improved power grid 2200 is similar to the first improved power grid 2100, except the multimedia core 2108 in the second improved power grid 2200 is coupled to three groups of package interconnects 2132, 2234 instead of the four groups of package interconnects 2132, 2134 in the first improved power grid 2100. Specifically, the multimedia core 2108 is coupled to two groups of package interconnects 2132, each comprising four package interconnects, and one group 2234 including eight package interconnects. As illustrated in FIG. 22, in some aspects, each group of package interconnects 2132, 2234 may comprise more or less than four package interconnects. Additionally, the improved power grid 2200 may comprise core devices that are not coupled to each power supply. As shown in FIG. 22, only three power supplies are coupled to the multimedia core 2108. That is, the nominal power supply 2114, the SVS power supply 2120, and the retention power supply 2118 are coupled to the multimedia core 2108. The number of power supplies and groups of package interconnects 2132 coupled to each core device may depend on the number of voltage levels at which the core device operates. In the example of FIG. 21, the multimedia core 2108 rail operate at only three different voltage levels, and so the package interconnects for the multimedia core 2108 are divided into three groups 2132, 2234.

Although the improved power grids 2100 and 2200 illustrated in FIG. 21 and FIG. 22, respectively, have specific amounts of package interconnects, groups of package interconnects, core devices, rails, and power supplies, FIG. 21 and FIG. 22 are examples only. According to some aspects of the present disclosure, an improved power grid may have different numbers of package interconnects, groups of package interconnects, core devices, rails, and power supplies. For example, an SoC may have several thousand package interconnects, each group of package interconnects 2132 comprising hundreds of package interconnects. In some aspects, one core device may be coupled to more package interconnects and/or more groups of package interconnects than another core device. Additionally, the improved power grid may comprise other core devices instead of or in addition to the core devices illustrated. For example, the improved power grid may comprise a DSP or an NPU, such as those illustrated in FIG. 1.

In a conventional power grid, such as those illustrated in FIG. 18 19, the number of core device rails may be equal to the number of required power supplies. In an improved power grid, such as those illustrated in FIGS. 21 and 22, the number of power supplies may correspond to the number of specified voltage levels. For example, if an AR SoC specifies four voltage levels, the AR SoC may have only four power supplies instead of the seven or more power supplies the AR SoC may need with a conventional power grid.

FIG. 23 is a table illustrating improved power grid use cases, according to various aspects of the present disclosure. The vertical columns in FIG. 23 show three example use cases for an improved power grid. Each use case involves four core devices, an APC, GPU, multimedia (MM), and NSP. Each core device in each use case operates at a power level, such as SVS, SVS_L1, or nominal (NOM). Each core device specifies a different amount of current, such as two amps, three amps, or four amps. The horizontal rows in FIG. 23 show four power supplies, S1, S2, S3, and S4. Each power supply may supply up to 4.5 amps of current. An example power level is depicted for each power supply in each use case. In the last row, the power supplies are mapped to core devices according to each use case.

In the first use case, the APC specifies a nominal voltage level and 4 amps, the GPU specifies an SVS_L1 voltage level and 2 amps, the multimedia core specifies an SVS voltage level and 3 amps, and the NSP specifies an SVS voltage level and 3 amps. In this example, the power supply S1 is set at an SVS voltage level, the power supply S2 is set at an SVS voltage level, the power supply S3 is set at an SVS_L1 voltage level, and the power supply S4 is set at a nominal voltage level. The power supplies S1 and S2 provide current to the multimedia core and NSP. The power supply S3 provides current to the GPU. The power supply S4 provides current to the APC.

In the second use case, the APC specifies an SVS voltage level and 3 amps, the GPU specifies a nominal voltage level and 3 amps, the multimedia core specifies a nominal voltage level and 4 amps, and the NSP specifies an SVS voltage level and 3 amps. In this example, the power supply S1 is set at an SVS voltage level, the power supply S2 is set at an SVS voltage level, the power supply S3 is set at a nominal voltage level, and the power supply S4 is set at a nominal voltage level. The power supply S1 provides current to the APC, the power supply S2 provides current to the NSP, and the power supplies S3 and S4 provide current to the GPU and multimedia core.

In the third use case, the APC specifies an SVS voltage level and 3 amps, the GPU specifies an SVS voltage level and 2 amps, the multimedia core specifies an SVS voltage level and 4 amps, and the NSP specifies an SVS voltage level and 3 amps. In this example, the power supplies S1, S2, and S3 are all set at an SVS voltage level. The power supply S4 is turned off. The power supply S1 provides current to the APC, and the power supplies S2 and S3 provide current to the multimedia core, GPU, and NSP.

Figure 24:
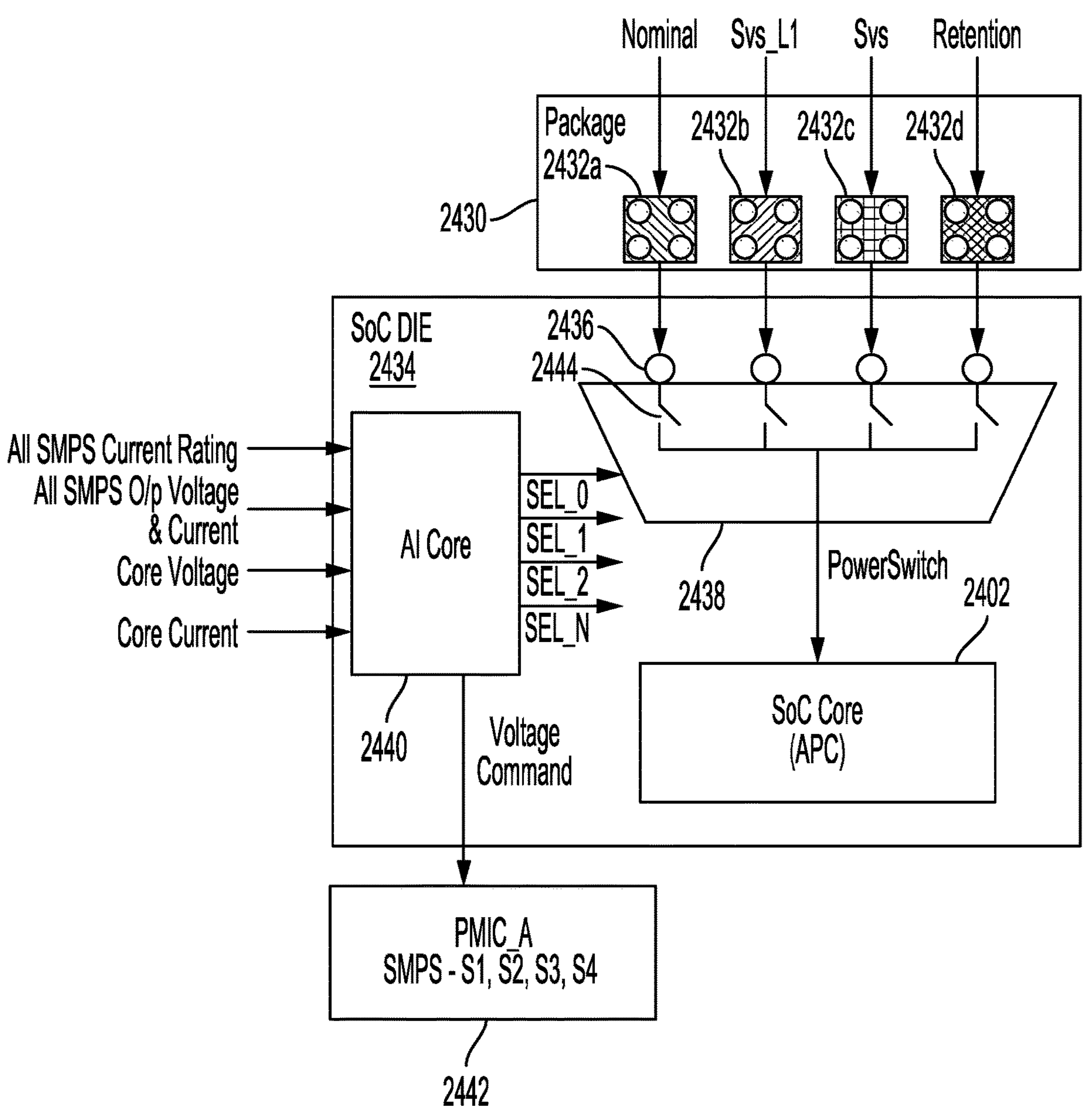
FIG. 24 is a diagram illustrating an intelligent power switch, according to various aspects of the present disclosure.

FIG. 24 is a diagram illustrating an intelligent power switch, according to various aspects of the present disclosure. In the example illustrated in FIG. 24, a package 2430 comprises four dedicated groups of package interconnects (e.g., package balls) 2432*a*, 2432*b*, 2432*c*, and 2432*d*. Each group of package interconnects 2432*a*, 2432*b*, 2432*c*, and 2432*d* is coupled to a power supply S1, S2, S3, S4 (connection not shown), the power supply S1, S2, S3, S4 operating at a specified voltage level. The first group of package interconnects 2432*a* receives power at a nominal voltage level. The second group of package interconnects 2432*b* receives power at an SVS_L1 voltage level. The third group of package interconnects 2432*c* receives power at an SVS voltage level. The fourth group of package interconnects 2432*d* receives power at a retention voltage level. Each group of package interconnects 2432*a*, 2432*b*, 2432*c*, and 2432*d* is coupled to a power switch 2438 via a die bump 2436.

The power switch 2438, comprising four terminals 2444 (only one terminal is labeled), is an electrical component that can connect or disconnect electrical circuits. The power switch 2438 may be an analog power switch or a digital power switch. The power switch 2438 may be actuated by one or more devices, such as an artificial intelligence (AI) core 2440. As illustrated in FIG. 24, the power switch 2438 may selectively couple one or more groups of package interconnects 2432*a*, 2432*b*, 2432*c*, and/or 2432*d* to one or more core devices, such as an APC 2402.

The AI core 2440 may control the power switch 2438 via one or more select lines SEL_0, SEL_1, SEL_2, and SEL_N. The AI core 2440 may receive one or more inputs, such as core device current requirement, core device voltage requirement, output voltage of all power supplies, and rated current and load of all power supplies. Using the one or more inputs, the AI core 2440 may determine whether each terminal 2444 of the power switch 2438 should be closed or open for each core device. The AI core 2440 may also use the one or more inputs to determine the output voltage for each power supply. The AI core 2440 may toggle the power switch 2438 between each power supply and core device based on one or more determinations. In some aspects, the AI core 2440 may toggle the power switch 2438 such that one or more power supplies meet the voltage and current requirements of one or more core devices. The AI core 2440 may also toggle the power switch 2438 to ensure that a low power consumption is achieved across all core devices with respect to each power supply. To toggle the power switch 2438, the AI core 2440 may connect or disconnect one or more terminals 2444 of the group of four terminals within the power switch 2438.

To make determinations, the AI core 2440 may implement one or more machine learning models, such as the neural networks described with respect to FIGS. 5A-D, 6, and 7. For example, an AI model implemented in the AI core 2440 may receive, as input, core device current requirement, core device voltage requirement, output voltage of all power supplies, and rated current and load of all power supplies. The AI model may then determine a power mapping based on the one or more inputs, the power mapping indicating voltage levels for one or more power supplies and one or more core devices to be powered by the power supplies. Using the power mapping, a device implementing the AI core 2440 may adjust voltage levels for one or more power supplies and one or more power connections between core devices and power supplies. For example, the AI core 2440 may use one or more selection outputs to toggle the power switch 2438.

As illustrated in FIG. 24, an SoC die 2434 may include the APC 2402, the AI core 2440, and the power switch 2438. A PMIC 2442 may include a group of power supplies (S1, S2, S3, S4), the PMIC 2442 receiving a voltage command from the AI core 2440. The PMIC 2442 may adjust the voltage level of one or more switch-mode power supplies (SMPS) S1, S2, S3, S4 based on the voltage command received from the AI core 2440.

Figure 25:
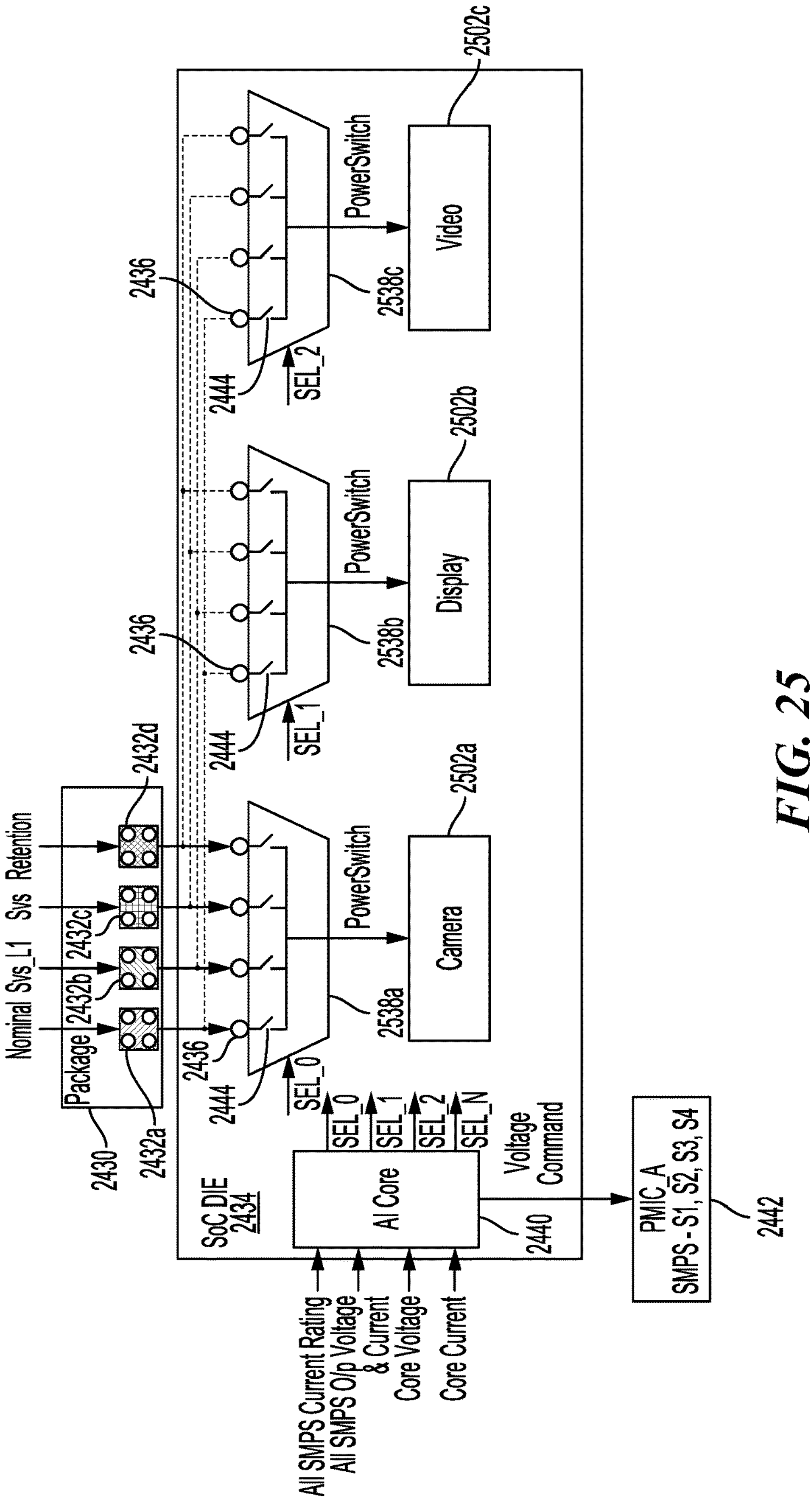
FIG. 25 is a diagram illustrating an intelligent power switch grid, according to various aspects of the present disclosure.

FIG. 25 is a diagram illustrating an intelligent power switch grid, according to various aspects of the present disclosure. Elements with like reference numbers from FIG. 24 are the same and not described again. In the example of FIG. 25, the SoC die 2434 comprises a multimedia power rail including a first power switch 2538*a*, a second power switch 2538*b*, and a third power switch 2538*c*. Each power switch 2538*a-c* has four terminals 2444 (only one terminal is labeled). Each power switch 2538*a-c* is coupled to a core device. The first power switch 2538*a* is coupled to a camera core 2502*a*, the second power switch 2538*b* is coupled to a display core 2502*b*, and the third power switch 2538*c* is coupled to a video core 2502*c*. As illustrated in FIG. 25, each group of package interconnects 2432*a*, 2432*b*, 2432*c*, and 2432*d* may selectively couple to each core device 2502*a*, 2502*b*, and 2502*c*. An AI core 2440 may toggle the connection between each group of package interconnects 2432*a*, 2432*b*, 2432*c*, and 2432*d* and each core device 2502*a*, 2502*b*, 2502*c* via select lines SEL_0, SEL_1, SEL_2 (SEL_N is not used in the example of FIG. 25). The AI core 2440 may also change the voltage of each power supply S1, S2, S3, S4 coupled to each dedicated group of package interconnects 2432*a*, 2432*b*, 2432*c*, and 2432*d*.

Figure 26:
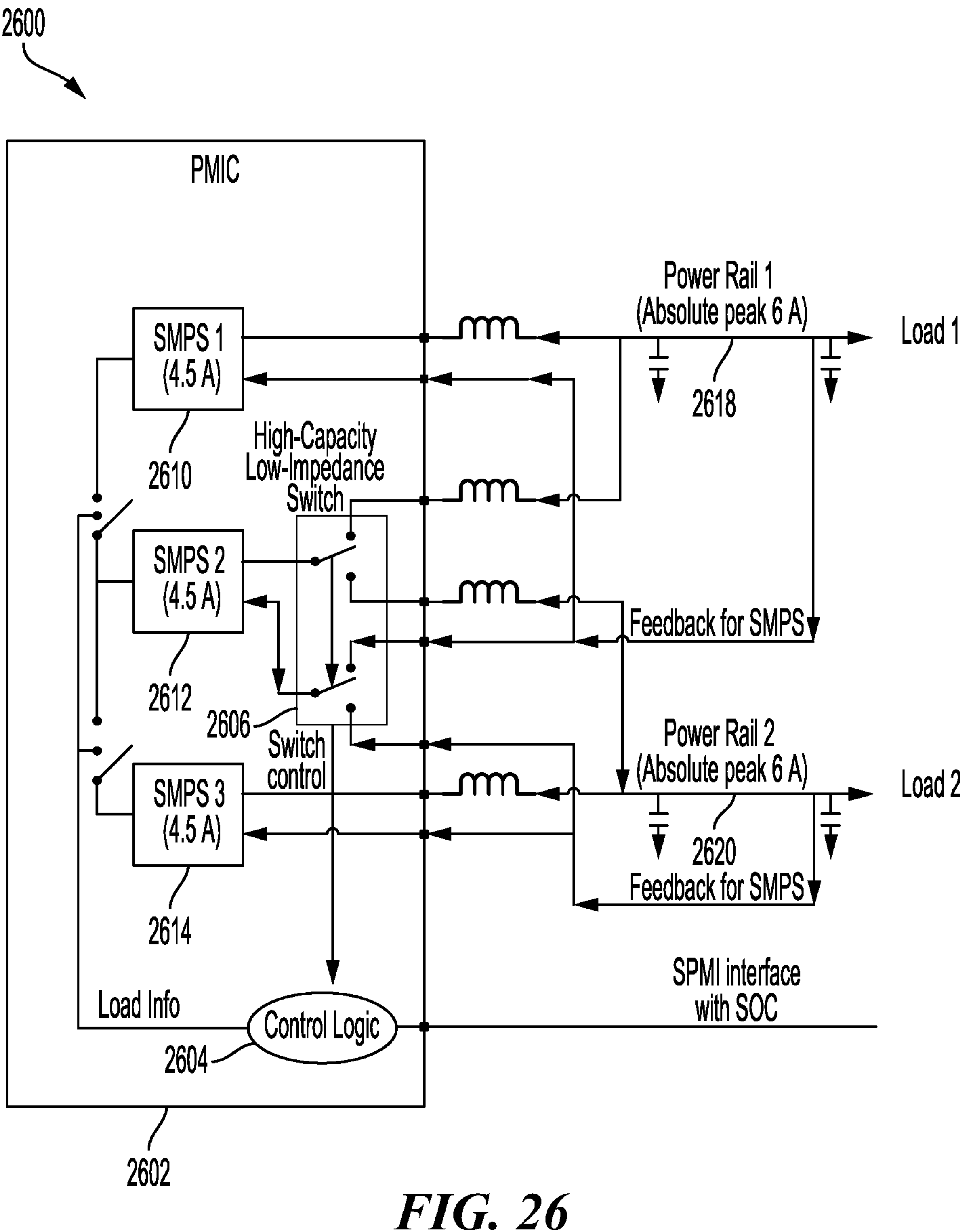
FIG. 26 is a circuit diagram illustrating a printed circuit board (PCB) with a power controller inside of a main power management integrated circuit (PMIC), according to various aspects of the present disclosure.

FIG. 26 is a circuit diagram illustrating a printed circuit board (PCB) with a power controller inside of a main power management integrated circuit (PMIC), according to various aspects of the present disclosure. As illustrated in FIG. 26, a PCB 2600 comprises a PMIC 2602, a control logic unit 2604, a power controller 2606, a first power supply 2610, a second power supply 2612, a third power supply 2614, a first power rail 2618, and a second power rail 2620. The power controller 2606 may be a high-capacity, low-impedance switch. The switch may be a single input, dual output switch at the output of the second power supply 2612. A 2:1 analog multiplexor may also be added on the feedback path of the second power supply 2612. The control logic unit 2604 may receive input, such as voltage or current indications, via a system power management interface (SPMI). The control logic unit 2604 may also receive input from the first power supply 2610, the second power supply 2612, and/or the third power supply 2614. Based on the input, the control logic unit 2604 may toggle the power controller 2606, such that the second power supply 2612 provides power to the first power rail 2618, the second power rail 2620, both power rails, or neither power rail. The first power rail 2618 may be coupled to a first load, such as a multimedia core, and the second power rail 2620 may be connected to a second load, such as a memory controller.

Unlike mobile or compute platforms, in AR glasses, many use cases specify the cores to be operational at low voltage corners that translate to small peak current that can fit into a single buck (e.g., single power supply) capacity (e.g., 4.5 A). Only a few use cases and/or high temperature conditions specify cores to operate at maximum voltage corners that push the peak current above a single buck limit. Buck allocation generally supports a worst case peak current. Hence, some core rails end up requiring buck ganging (e.g., multi-phase operation). Aspects of the present disclosure reduce buck count bloat by intelligently and dynamically assigning an additional buck phase to the load only when needed. The additional buck phase may be shared among two or more rails (e.g., loads). According to these aspects, when either core (e.g., NSP or multimedia core) specifies an additional buck, then the second buck phase is allocated to only that rail that requires the additional buck. Hence, the second buck phase is shared between the two rails. Instead of two additional bucks required for the two rails, only one additional buck is required for both rails together. These aspects save PMIC die area and hence PCB area that is critical for AR glasses to achieve the desired form factor. These aspects save cost, as well.

Sharing of a buck between two rails may be achieved by implementing low-impedance switches inside a PMIC. When both rails need the second buck, peak current of one of the rails may be throttled. Without the proposed solution and without the second buck allocation, rails would be throttled more often. Hence, aspects of the present disclosure reduce the need for throttling that may result in a poor user experience resulting from throttling critical rails of the multimedia or NSP cores that run algorithms, like perception, at the heart of the system. This solution reduces buck count, and hence PCB area, enabling a sleek form factor design.

As illustrated in FIG. 26, the second power supply 2612 may be shared between the first power rail 2618 and the second power rail 2620. Switches within the power controller 2606 receive instructions from the control logic unit 2604 to selectively couple the first power rail 2618 or the second power rail 2620 to the second power supply 2612. Software within the control logic unit 2604 or another device on the PCB determines the load that should receive power from the second power supply 2612, depending on factors such as the current task of the core. The software may be, for example, a commanded mode feature that shuts off a phase in a multi-phase configuration. The same software may disconnect a power supply from one core (e.g., ganged configuration or load) and assign the power supply to another core (e.g., ganged configuration or load). FIG. 26 shows one additional phase. The same solution can be extended to any number of rails and any number of additional phases of bucks that are desired.

Figure 27:
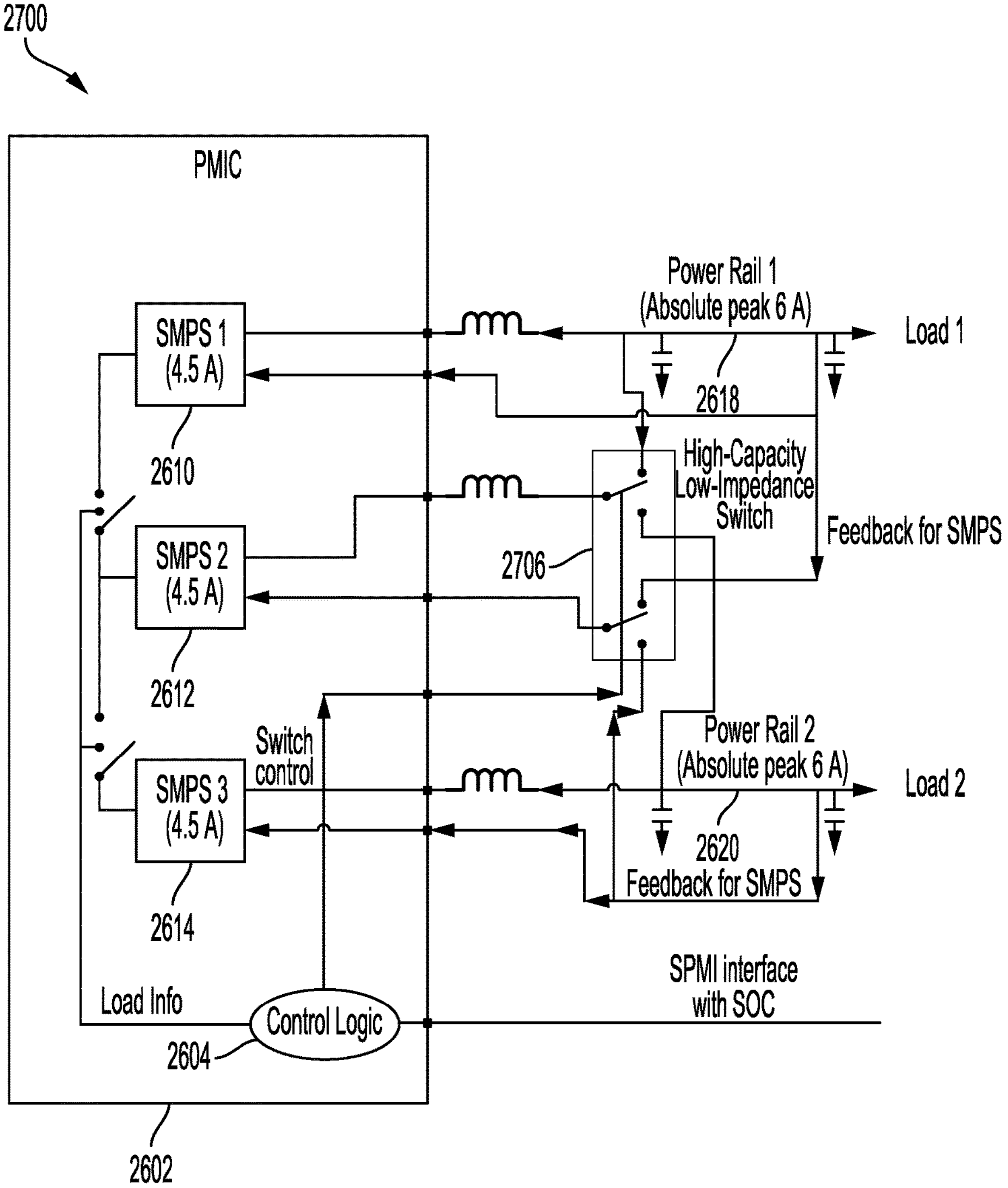
FIG. 27 is a circuit diagram illustrating a PCB with a power controller outside of a PMIC, according to various aspects of the present disclosure.

FIG. 27 is a circuit diagram illustrating a PCB 2700 with a power controller outside of a PMIC, according to various aspects of the present disclosure. As illustrated by FIG. 27, a power controller 2706 may, in some aspects, be located outside of the PMIC 2602. In these aspects, the power controller 2706 may receive inputs from a PMIC general-purpose input and output (GPIO) and/or an SoC GPIO.

According to further aspects of the present disclosure, intelligent allocation of additional buck phases may be controlled by machine learning. When a use case results in increasing the voltage corner of the rail, a machine learning module in the processor can map the voltage corner to a peak current along with a command for buck output voltage change. The machine learning module may also send a command to the PMIC over the SPMI to gang the shared buck to the primary phase buck. The machine learning module can have priorities for the rails for additional phase allocation. For example, when a perception algorithm runs, if both a computer vision accelerator process under the multimedia power rail and the NSP core under the NSP power rail need an additional buck, the machine learning module can choose to run the computer vision accelerator first by allocating the additional phase to the multimedia power rail and then the perception pipeline uses the NSP during which the machine learning module assigns the second phase buck to the NSP power rail.

Additionally, machine learning can be incorporated to learn the pattern of rail current with respect to voltage corner voting. In these aspects, until the learning happens, the cores are throttled. As the machine learning module learns the peak current drawn for different use cases, the machine learning module can start assigning additional phases of bucks dynamically, for example as described above.

Peak current may be measured in various manners. Estimated peak currents for known use cases can be stored in a database. Dynamic use cases with peak currents that have not been characterized may be processed by the machine learning module based on inputs from current sensors, such as digital power meters (DPMs) in the processor or embedded power meters (EPMs) in the PMIC that measure current. Then, the machine learning module assigns the shared buck if the peak current learned for a particular use case exceeds a single buck peak limit.

Figure 28:
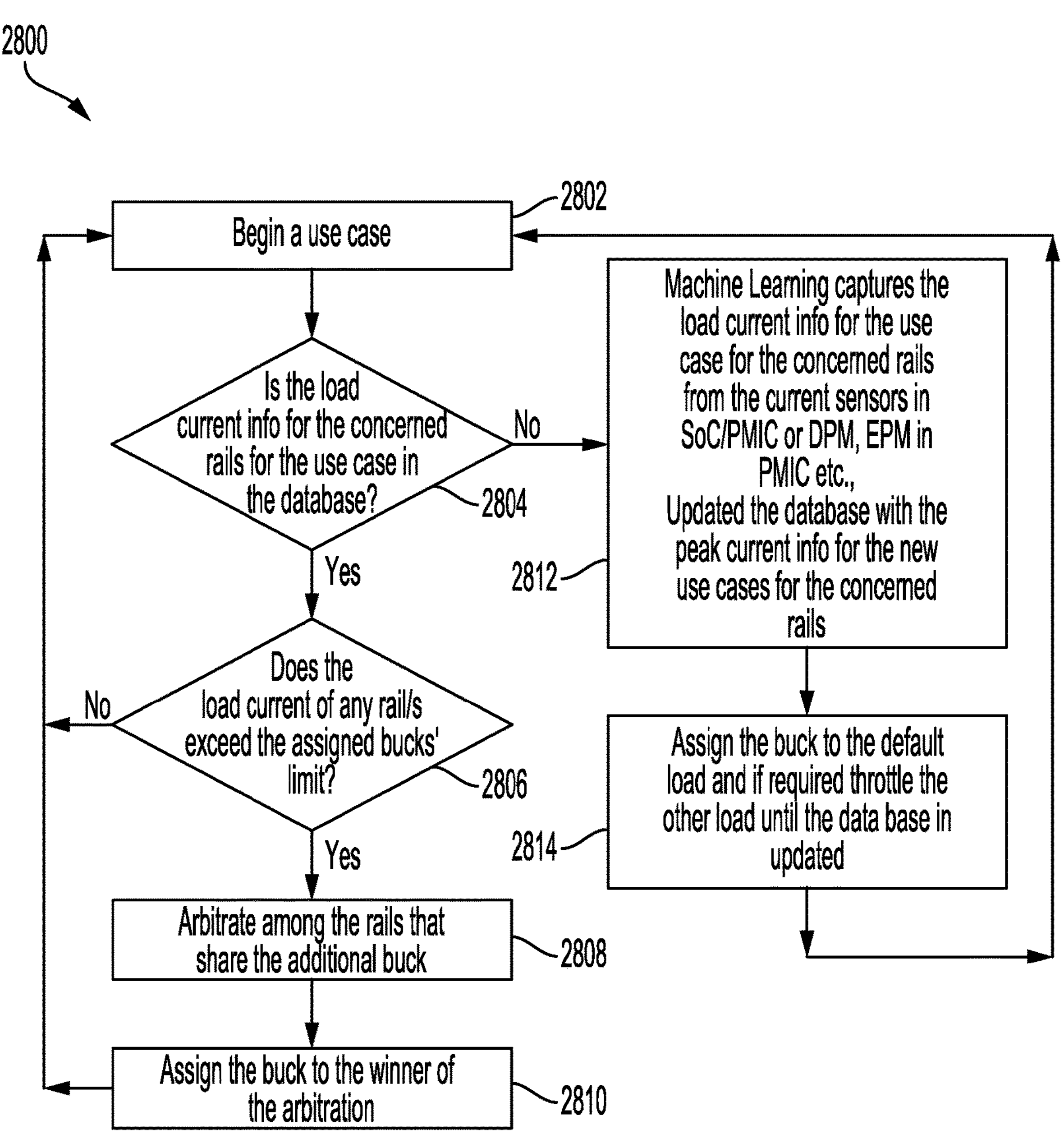
FIG. 28 is a flow diagram illustrating an example process for a power supply allocation pipeline, according to various aspects of the present disclosure.

FIG. 28 is a flow diagram illustrating an example process 2800 for a power supply allocation pipeline, according to various aspects of the present disclosure. At block 2802, a particular use case (e.g., task) begins. For example, a perception algorithm may run. At block 2804, the machine learning module determines if the load current information for the concerned rails for the use case are stored in a database. If so, at block 2806, the machine learning module determines if the load current of any rail exceeds the assigned buck limit for this use case. For example, if the assigned buck has a 4.5 A limit but the perception algorithm needs 6 A, then the load current exceeds the buck limit for this use case. If the buck limit is exceeded, at block 2808, the machine learning module arbitrates among the rails that share the additional buck. For example, if the multimedia rail and the NSP rail share the additional buck, based on the information from the database, the machine learning module may first assign the shared buck to the multimedia rail for computer vision processing, and then at block 2810, reassign the shared buck to the NSP rail. After completing the buck allocation for the use case, the process 2800 returns to block 2802 to await a next use case. Similarly, if the load current of each rail does not exceed the assigned buck limit (2806: NO), the process 2800 returns to block 2802.

If the load current information is not in the database for the use case (2804:NO), the process proceeds to block 2812. At block 2812, the machine learning module captures the load current for the concerned rails for the new use case. The machine learning module may receive the data from current sensors in the PMIC or SoC, such as from a DPM or EPM. The machine learning module then updates the database with the peak current information for the concerned rails of the new use case. At block 2814, the machine learning module assigns the buck to a default load, and if necessary, throttles the other load until the database is updated. Throttling the other load until the database is updated may be necessary if the machine learning module is unable to assign the shared power supply to a rail with priority. The machine learning module may then need to throttle one or more rails until the database is updated so that the rails do not exceed a voltage or current specification. After the database is updated, the process 2800 returns to block 2802 to await the next use case.

Figure 29:
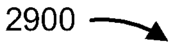
FIG. 29 is a flow diagram illustrating a method of dynamic power control, according to various aspects of the present disclosure.
Figure 29:
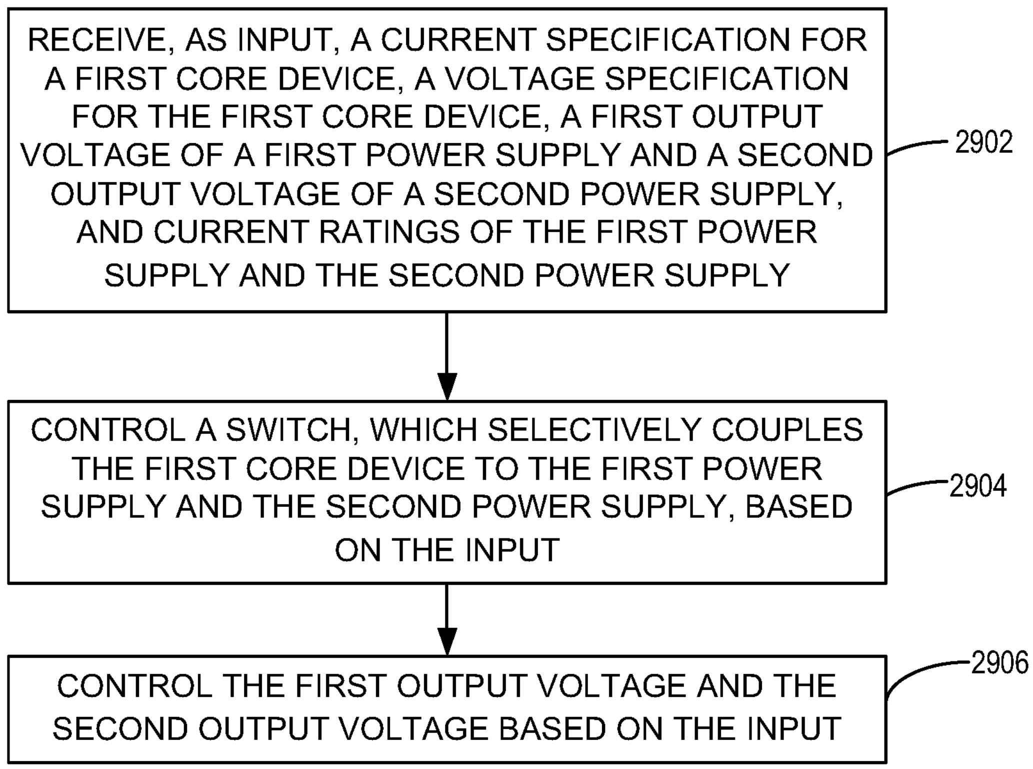

FIG. 29 is a flow diagram illustrating a method of dynamic power control, according to various aspects of the present disclosure. The method 2900 may be performed by one or more processors such as the CPU (e.g., 102), GPU (e.g., 104), and/or other processing unit, e.g., DSP 106, NPU 108, AI core 2440, or power switch (e.g., 2538*a*, 2538*b*, 2538*c*). In some aspects, the method 2900 may include receiving as input, a current specification for a first core device, a voltage specification for the first core device, a first output voltage of a first power supply, a second output voltage of a second power supply, and current ratings of the first power supply and the second power supply (block 2902). For example, a processing unit may implement a sensor, such as a DPM or an EPM, to generate various portions of the input. Various portions of the input, such as the current specification, voltage specification, and current ratings, may additionally or alternatively be predefined.

In some aspects, the method 2900 may also include controlling a switch, which selectively couples the first core device to the first power supply and the second power supply, based on the input (block 2904). For example, a processing unit may control the switch based on the first power supply and/or the second power supply satisfying the current specification for the first core device and the voltage specification for the first core device while minimizing power consumption by the first power supply and/or the second power supply. In still other aspects, the method 2900 may include controlling the first output voltage and the second output voltage based on the input (block 2906). For example, a processing unit may change the output voltage of a power supply such that the power supply satisfies the voltage specification of a core device.

EXAMPLE ASPECTS

Aspect 1: An apparatus, comprising: a plurality of core devices, each core device configured to operate at a plurality of voltage levels; and a power management integrated circuit (PMIC) comprising a plurality of power supplies, each power supply corresponding to one of the plurality of voltage levels, a first power supply of the plurality of power supplies corresponding to a first voltage level selectively coupled to a first core device of the plurality of core devices configured to operate at the first voltage level, a second power supply of the plurality of power supplies corresponding to a second voltage level selectively coupled to the first core device of the plurality of core devices configured to operate at the second voltage level.

Aspect 2: The apparatus of Aspect 1, further comprising a plurality of groups of package interconnects coupled to each core device, each group of package interconnects coupled to one of the plurality of power supplies.

Aspect 3: The apparatus of Aspect 1 or 2, further comprising a switch selectively coupling the first core device to the first power supply and the second power supply, the switch located on the PMIC.

Aspect 4: The apparatus of any of Aspect 1 or 2, further comprising a switch selectively coupling the first core device to the first power supply and the second power supply, the switch located outside of the PMIC.

Aspect 5: The apparatus of any of the preceding Aspects, further comprising a switch selectively coupling the first core device to the first power supply and the second power supply, the switch located on a die comprising the plurality of core devices.

Aspect 6: The apparatus of any of the preceding Aspects, further comprising a switch selectively coupling the first core device to the first power supply and the second power supply, the switch located on a printed circuit board (PCB) coupled to the PMIC and to a die comprising the plurality of core devices.

Aspect 7: The apparatus of any of the preceding Aspects, further comprising an artificial intelligence (AI) core coupled to a switch and to the PMIC, the switch selectively coupling the first core device to the first power supply and the second power supply, the AI core configured to control the switch and the PMIC based on receiving a current specification for the first core device, a voltage specification for the first core device, output voltages of the first power supply and the second power supply, and current ratings of the first power supply and the second power supply.

Aspect 8: The apparatus of Aspect 1-3 or 5-7, further comprising means for selectively coupling the first core device to the first power supply and the second power supply, the selectively coupling means located on the PMIC.

Aspect 9: The apparatus of Aspect 1, 2, or 4-7, further comprising means for selectively coupling the first core device to the first power supply and the second power supply, the selectively coupling means located outside of the PMIC.

Aspect 10: The apparatus of any of the preceding Aspects, further comprising means for selectively coupling the first core device to the first power supply and the second power supply, the selectively coupling means located on a die comprising the plurality of core devices.

Aspect 11: The apparatus of any of the preceding Aspects, further comprising means for selectively coupling the first core device to the first power supply and the second power supply, the means located on a printed circuit board (PCB) coupled to the PMIC and to a die comprising the plurality of core devices.

Aspect 12: The apparatus of any of the preceding Aspects, further comprising an artificial intelligence (AI) core coupled to a switching means and to the PMIC, the switching means selectively coupling the first core device to the first power supply and the second power supply, the AI core configured to control the switching means and the PMIC based on receiving a current specification for the first core device, a voltage specification for the first core device, output voltages of the first power supply and the second power supply, and current ratings of the first power supply and the second power supply.

Aspect 13: A method, comprising: receiving as input, a current specification for a first core device, a voltage specification for the first core device, a first output voltage of a first power supply and a second output voltage of a second power supply, and current ratings of the first power supply and the second power supply; controlling a switch, which selectively couples the first core device to the first power supply and the second power supply, based on the input; and controlling the first output voltage and the second output voltage based on the input.

Aspect 14: The method of Aspect 13, further comprising controlling the switch based on the first power supply and/or the second power supply satisfying the current specification for the first core device and the voltage specification for the first core device while minimizing power consumption by the first power supply and/or the second power supply.

Aspect 15: A method, comprising: performing a task on a device having a shared power supply for a plurality of power rails; determining whether current load information for the task is stored in a database; detecting a task specific peak current level for each of the plurality of power rails, storing the task specific peak current level for each of the plurality of power rails in the database as current load information, and assigning the shared power supply to a default power rail, in response to determining the current load information for the task is not stored in the database; determining whether any of the plurality of power rails exceed a limit of the shared power supply for the task, in response to determining the current load information for the task is stored in the database; and allocating, based on machine learning, the shared power supply to one of the plurality of power rails in response to at least one of the plurality of power rails exceeding the limit of the shared power supply.

Aspect 16: The method of Aspect 15, further comprising throttling a second power rail, in response to determining the current load information for the task is not stored in the database, until machine learning based on the database is complete.

Aspect 17: The method of Aspect 15 or 16, in which the detecting the task specific peak current level for each of the plurality of power rails is performed via a digital power meter (DPM) or an embedded power meter (EPM).

Aspect 18: The method of Aspect 15-17, in which allocating the shared power supply to one of the plurality of power rails is based on arbitrating between the plurality of power rails, the shared power supply being assigned to a selected power rail based on a task based priority.

Aspect 19: The method of Aspect 15-18, in which allocating the shared power supply to one of the plurality of power rails is based on arbitrating between the plurality of power rails, the shared power supply being assigned to a selected power rail based on a database indication.

Aspect 20: The method of Aspect 15-19, in which the database indication comprises the task specific peak current level associated with any number of power rails of the plurality of power rails.

In accordance with this disclosure, the term "or" may be interrupted as "and/or" where context does not dictate otherwise. Additionally, while phrases such as "one or more" or "at least one" or the like may have been used for some features disclosed herein but not others; the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices, Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules or units are described in this disclosure to emphasize functional aspects of devices configured to perform the disclosed techniques, but do not necessarily require realization by different hardware units. Rather, as described above, various units may be combined in any hardware unit or provided by a collection of interoperative hardware units, including one or more processors as described above, in conjunction with suitable software and/or firmware.

Various examples have been described. These and other examples are within the scope of the following claims.

What is claimed is:

1. An apparatus, comprising:

a plurality of core devices, each core device configured to operate at a plurality of voltage levels;

a power management integrated circuit (PMIC) comprising a plurality of power supplies, each power supply corresponding to one of the plurality of voltage levels, a first power supply of the plurality of power supplies corresponding to a first voltage level selectively coupled to a first core device of the plurality of core devices configured to operate at the first voltage level, a second power supply of the plurality of power supplies corresponding to a second voltage level selectively coupled to the first core device of the plurality of core devices configured to operate at the second voltage level; and an artificial intelligence (AI) core coupled to a switch and to the PMIC, the switch selectively coupling the first core device to the first power supply and the second power supply, the AI core configured to control the switch and the PMIC based on receiving a current specification for the first core device, a voltage specification for the first core device, output voltages of the first power supply and the second power supply, and current ratings of the first power supply and the second power supply.

2. The apparatus of claim 1, further comprising a plurality of groups of package interconnects coupled to each core device, each group of package interconnects coupled to one of the plurality of power supplies.

3. The apparatus of claim 1, further comprising a switch selectively coupling the first core device to the first power supply and the second power supply, the switch located on the PMIC.

4. The apparatus of claim 1, further comprising a switch selectively coupling the first core device to the first power supply and the second power supply, the switch located outside of the PMIC.

5. The apparatus of claim 1, further comprising a switch selectively coupling the first core device to the first power supply and the second power supply, the switch located on a die comprising the plurality of core devices.

6. The apparatus of claim 1, further comprising a switch selectively coupling the first core device to the first power supply and the second power supply, the switch located on a printed circuit board (PCB) coupled to the PMIC and to a die comprising the plurality of core devices.

7. The apparatus of claim 1, further comprising means for selectively coupling the first core device to the first power supply and the second power supply, the selectively coupling means located on the PMIC.

8. The apparatus of claim 1, further comprising means for selectively coupling the first core device to the first power supply and the second power supply, the selectively coupling means located outside of the PMIC.

9. The apparatus of claim 1, further comprising means for selectively coupling the first core device to the first power supply and the second power supply, the selectively coupling means located on a die comprising the plurality of core devices.

10. The apparatus of claim 1, further comprising means for selectively coupling the first core device to the first power supply and the second power supply, the means located on a printed circuit board (PCB) coupled to the PMIC and to a die comprising the plurality of core devices.

* * * * *